(12) United States Patent
Ortner et al.

(10) Patent No.: US 12,486,197 B2
(45) Date of Patent: Dec. 2, 2025

(54) METHOD OF SURFACE STRUCTURING A SUBSTRATE BODY AND SUBSTRATE BODY

(71) Applicant: SCHOTT AG, Mainz (DE)

(72) Inventors: Andreas Ortner, Gau-Algesheim (DE); David Sohr, Mainz (DE); Jens Ulrich Thomas, Mainz (DE)

(73) Assignee: SCHOTT AG, Mainz (DE)

( * ) Notice: Subject to any disclaimer, the term of this patent is extended or adjusted under 35 U.S.C. 154(b) by 539 days.

(21) Appl. No.: 17/466,688

(22) Filed: Sep. 3, 2021

(65) Prior Publication Data

US 2022/0073427 A1 Mar. 10, 2022

(30) Foreign Application Priority Data

Sep. 4, 2020 (EP) .................................. 20194675
Feb. 26, 2021 (EP) .................................. 21159715

(51) Int. Cl.
*C03C 23/00* (2006.01)
*C03C 15/00* (2006.01)

(52) U.S. Cl.
CPC .......... *C03C 23/0025* (2013.01); *C03C 15/00* (2013.01)

(58) Field of Classification Search
CPC ............... B23K 26/53; B81C 1/00595; B81C 2201/0143; C03C 15/00; C03C 23/0025
USPC ..................................................... 219/121.75
See application file for complete search history.

(56) References Cited

U.S. PATENT DOCUMENTS

| | | |
|---|---|---|
| 2014/0199519 A1 | 7/2014 | Schillinger |
| 2017/0203994 A1* | 7/2017 | Chen ...................... C03B 33/102 |
| 2017/0252859 A1 | 9/2017 | Flamm et al. |
| 2017/0259375 A1 | 9/2017 | Flamm et al. |
| 2019/0062196 A1* | 2/2019 | Bui ........................ C03B 33/091 |
| 2019/0119150 A1* | 4/2019 | Burket ................ C03C 23/0025 |

FOREIGN PATENT DOCUMENTS

| | | |
|---|---|---|
| CN | 105209218 A | 12/2015 |
| EP | 3670081 A1 | 6/2020 |
| EP | 3822235 A1 | 5/2021 |
| JP | 2018-070429 | 5/2018 |
| WO | 2021076432 A1 | 4/2021 |

* cited by examiner

*Primary Examiner* — Ibrahime A Abraham
*Assistant Examiner* — Joseph W Iskra
(74) *Attorney, Agent, or Firm* — Ruggiero McAllister & McMahon LLC

(57) ABSTRACT

A method for preparing and/or carrying out the structuring of a predetermined or predeterminable distinguished surface of a substrate body having a substrate material includes exposing the substrate material in at least one curved effective area to an electromagnetic field which in each of the at least one curved effective area causes a non-linear interaction between the electromagnetic field and the substrate material, and thus at least partially influencing the substrate material arranged in the curved effective area. After the structuring of the distinguished surface the distinguished surface has at least in certain areas at least one first curved progression which is at least partially determined and/or influenced by the curved shape of the at least one curved effective area. The nonlinear interaction causes at least one nonlinear absorption of the electromagnetic field in the substrate material.

11 Claims, 9 Drawing Sheets

METHOD OF SURFACE STRUCTURING A SUBSTRATE BODY AND SUBSTRATE BODY

CROSS-REFERENCE TO RELATED APPLICATIONS

The present application claims priority to European Patent Application EP20194675.3, filed on Sep. 4, 2020, and European Patent Application EP21159715.8, filed on Feb. 26, 2021, the entire contents of each of which are incorporated by reference herein.

BACKGROUND OF THE DISCLOSURE

1. Field of the Disclosure

The present disclosure relates to a method for preparing and/or performing the structuring of a surface of a substrate body. The disclosure also relates to a substrate body.

2. Description of the Related Art

In order to process a starting substrate so that a predetermined surface, such as a separation surface, is formed, prior art separation processes by scoring and breaking, wheel cutting, laser-based thermal separation, i.e. mechanically pre-damaging the substrate and guiding a crack through a thermal stress field in the material, and laser-based perforation separation, i.e. filamenting along a contour and subsequent mechanical or thermal separation along the perforation, are known.

However, these processes have the disadvantage that the predetermined target surface is often not achieved. This is sometimes due to the pre-damages of the substrate material, which are also deliberately introduced, which, however, cannot be adequately controlled.

It is therefore an object of the present disclosure to be able to reliably form a planned surface in a substrate body.

SUMMARY OF THE DISCLOSURE

The object is achieved according to a first aspect of the disclosure in that a method for preparing and/or carrying out the structuring of a predetermined or predeterminable distinguished surface of a substrate body comprising a substrate material, wherein the method comprises exposing the substrate material in at least one curved effective area to an electromagnetic field which in each of the at least one curved effective area causes a non-linear interaction between the electromagnetic field and the substrate material, and thus at least partially influencing the substrate material arranged in the curved effective area, wherein after the structuring of the distinguished surface the distinguished surface comprises at least in certain areas at least one first curved progression which is at least partially determined and/or influenced by the curved shape of the at least one curved effective area, wherein the nonlinear interaction causes at least one non-linear absorption of the electromagnetic field in the substrate material, is proposed.

This is based on the surprising finding that the spatial extent of the electromagnetic field, i.e. the shape of the individual curved effective areas, can be exploited to predetermine the planned surface, at least in its basic progression.

The substrate material is thus exposed to an electromagnetic field. In at least one area of the electromagnetic field, wherein the area is curved, a non-linear interaction takes place between the electromagnetic field and the substrate material. As a result, in this curved region, which is referred to as the curved effective area, the substrate material arranged in this area is at least partially influenced.

Herein, this influencing of the substrate material can be understood, for example, as a volume modification in the substrate material. The type of modification can include cracks, voids (cavities) and/or changes in the structure of the substrate material, which in particular result in faster etching removal (compared to the uninfluenced substrate material).

For example, then, moreover, an interface can be found between the influenced and uninfluenced substrate material. This corresponds to the surface of the curved effective area. This interface can extend entirely or partially within the substrate material. In the case where a cavity is created by the nonlinear interaction, the interface can correspond to the surface of the cavity.

Thus, the unaffected substrate material has the complementary shape of the curved effective area. Or, in other words, the uninfluenced substrate material comprises locally a surface that positively interacts with the surface of the influenced area.

By exposing and/or further processing this surface of the uninfluenced substrate material, the distinguished surface can be provided while maintaining the imparted progression.

The spatial formation of the curved effective area can be made very flexible by giving a corresponding shape to the area in which the electromagnetic field can interact nonlinearly with the substrate material. Thus, by controlling the areas of nonlinear interaction via the electromagnetic field, the curved effective areas can be defined and controlled. As a result, a distinguished surface can be structured not only on the outside of the substrate body, but also wholly or partially inside the substrate body.

In one embodiment, a nonlinear interaction is achieved in that the intensity of the electromagnetic field has, at least in certain areas, such an intensity that it results in a nonlinear interaction with the substrate material. The curved effective area is then disposed in the volume areas in which there is a correspondingly high intensity.

For example, a curved effective area can be formed entirely within the substrate. Or, it can extend into the interior of the substrate body from at least one surface of the substrate. In this regard, the curved effective area can also extend up to another surface of the substrate body. Alternatively or additionally, the curved effective area can also have in intersection with another surface, such as a side surface, of the (unstructured) substrate body. The latter is particularly interesting if a side surface of the substrate body is to be structured. Then, a curved effective area can be formed within the substrate material such that it is intersected by, for example, three side surfaces of the unstructured substrate body.

Consequently, the method enables particularly easy and efficient to prepare or perform a structuring of a planned surface as a distinguished surface of the substrate body. Herein, the shape of the influenced substrate material can be chosen almost arbitrarily. Only a correspondingly shaped electromagnetic field must be provided or be able to be provided, to which the substrate material is (locally) exposed and with which it can interact non-linearly.

The term "structuring of the distinguished surface" is generally understood to mean the formation of a previously non-existent surface of the substrate body. This can be accomplished, for example, by manipulating an existing surface, such as by ultimately removing substrate material in the surface region of the existing surface, thereby forming the new surface as the distinguished surface. This can also be accomplished, for example, by separating a portion of the substrate material from the substrate body along a planned surface, thereby exposing the new surface as an distinguished surface. Of course, the transition can be smooth between when an existing surface is still being manipulated and when a portion of the substrate material is already being separated.

However, the distinction in this respect is also not critical, since in both cases substrate material of the substrate body is influenced with the aim of (partially) determining or influencing the progression of the interface between influenced and uninfluenced substrate material and thus the progression of the planned or distinguished surface by the shape of the curved effective area.

It is thus preferably possible that the material to be removed for structuring the distinguished surface can be removed from the original substrate body in a form other than powder. This process is then also applicable in rooms with high cleanliness requirements, such as clean rooms. For example, a powder is present at a particle size of less than 10 nm.

In one embodiment, material is removed from the original substrate body in order to structure the distinguished surface.

In one embodiment, the material removed from the original substrate body for structuring the distinguished surface is removed from the original substrate body as entirely or at least partially contiguous piece(s) of material.

Herein, distinguished surfaces of different types can be structured. This enables to provide substrate bodies for different application purposes.

For example, a nonlinear interaction can be caused in only one curved effective area. In this case, the substrate material is only influenced there. For example, the influenced substrate material can then be completely enclosed within the substrate material and cannot come to a surface of the substrate body. Or the influenced substrate material can come to a surface or to several, in particular two opposite, surfaces of the substrate body. Then, the influenced substrate material extends from one surface to the at least one other surface.

For example, a nonlinear interaction can also be caused in several curved effective areas and the substrate material can respectively be influenced there. The individual curved effective areas can then follow one another, for example. The curved effective areas can then also be offset relative to one another and/or rotated about a major axis of the respective effective area.

When the substrate material is influenced in a curved effective area, the shape of the curved effective area (partially) determines or influences the first progression of the distinguished surface. This is clear, because illustratively speaking, the substrate material is influenced in a curved volume region. The curved volume region has a surface which is also represents an interface to the uninfluenced substrate material. The surface area of the uninfluenced substrate material and that of the volume region are just complementary (negative) to each other. Thus, the shape of the curved effective area can co-determine or influence a surface area of the uninfluenced substrate material. Thus, the distinguished surface is (partially) determined or influenced by the curved shape of the effective area.

The method can optionally be operated with further measures and thus, in the overall view, produce no or only a few microcracks in the area of the distinguished surface.

As a result, the strength of the distinguished surface is high from the outset and the structured substrate body is thus extraordinarily resistant.

The method does not require the application of mechanical stress when cutting off parts of the substrate material. Thus, for example, a substrate body can be separated into two parts or a recess can be removed from it without mechanical stress. Thus, the substrate body is not stressed and is not or not particularly damaged.

Thus, the proposed method enables a starting substrate to be processed so that a predetermined or predeterminable surface, such as a separation surface, is formed as a distinguished surface.

The present disclosure thus provides a substrate body whose surface, in particular whose circumferential side surfaces, has a predetermined desired surface at least in certain areas and whose surfaces can preferably be etched as a whole. In this case, a stress-imparting separation process need not be used.

As a result, the distinguished surface can be formed very precisely.

In particular, the proposed method does not require polishing processes to be applied to the structured surface. In particular, when the structured surface represents a side surface of the substrate body in whole or in part, a polishing process, especially for thin substrate bodies, cannot be carried out or can only be carried out under difficult conditions.

This is because polishing processes of a substrate surface require, in particular in the case of side surfaces, a high dimensional stability of the substrate and thus correspondingly sufficient thicknesses in order to be able to handle mechanical clamping of the substrate body in the polishing machine. The present method does not require polishing processes, which is why even very thin substrate bodies can be structured.

In one embodiment, a nonlinear interaction between the electromagnetic field and the substrate material is present if a nonlinear absorption of the substrate material occurs at least in the region of the curved effective area due to the electromagnetic field.

For example, the nonlinear interaction between the electromagnetic field and the substrate material can comprise a nonlinear absorption of the substrate material.

In one embodiment, the substrate body consists of or comprises glass, glass ceramic, silicon, or sapphire.

In one embodiment, mechanical separation can be performed under a humid atmosphere and/or with $CO_2$ cleavage. This can be advantageously exploited to provide a substrate body with a bent or curved edge immediately after the interaction with the electromagnetic field.

The electromagnetic field is set within the curved effective areas in such a way that a nonlinear interaction between the electromagnetic field and the substrate material is induced there, in particular within the entire curved effective area.

In one embodiment, the substrate material in the at least one curved effective area is exposed to such an electromagnetic field that a nonlinear interaction between the electromagnetic field and the substrate material is caused in the curved effective area and that the substrate material arranged in the curved effective area is at least partially influenced.

In one embodiment, the nonlinear absorption of the electromagnetic field in the substrate material comprises causing a nonlinear absorption of a laser beam in the substrate material.

Alternatively or additionally, it can also be provided that the substrate material is exposed to an electromagnetic field in a plurality of curved effective areas, wherein preferably (i) the distinguished surface has the same first curved progression at several areas, in particular determined or influenced by the curved shape of the several curved effective areas, and/or has the first curved progression everywhere, and/or (ii) the curved effective areas are selected to be arranged at a distance from one another, wherein in particular in a cross-sectional plane of the substrate body the centers or centroids of the intersecting surfaces of the curved effective areas with the cross-sectional plane extend along a straight line or along any desired, in particular circular, curve, and/or successive effective areas have a distance from one another which is between 30% and 100% or between 100% and 200% of the maximum extent of the curved effective areas in the cross-sectional plane.

When multiple curved effective areas are used, an extended distinguished surface can be provided particularly easily. For example, an extended side surface of the substrate body can be reliably structured in this manner. The individual curved effective areas can then follow one another, for example. The curved effective areas can also each be offset relative to one another and/or rotated about a major axis of the respective effective area. Thus, a plurality of successive areas with influenced substrate material can be created, and the distinguished surface can be formed by exposing and/or further processing the respective interface between influenced and uninfluenced substrate material.

In one embodiment, the substrate material is exposed to an electromagnetic field in at least two curved effective areas. Preferably, the distinguished surface is determined or influenced by both curved effective areas, in particular at different locations. Thus, in one embodiment, it is possible that the first curved progression is achieved by the multiple curved effective areas at multiple regions of the distinguished surface.

The first curved progression can thereby also be determined or influenced by only a part of the curved effective area, in particular by a part of its outer surface. The degree to which a curved effective area co-determines the first curved progression can be related to how closely the individual effective areas follow one another and how the influenced substrate material is further processed.

In a cross-sectional plane of the substrate body, the individual curved effective areas can then extend arranged along a straight line or along any curve, in particular an arc of a circle or a complete circle. For example, there can be certain distances between the centers or centroids of the successive intersecting surfaces of the curved effective areas lying in the cross-sectional plane. The distances can be approximately between 100% and 200%, preferably between 110% and 150% or between 140% and 180%, of the maximum extent of the curved effective areas in the cross-sectional plane. In this case, the curved effective areas extend spaced apart from one another by so-called web areas. The distances can also be between 30% and 100%, preferably between 50% and 70% or between 60% and 80%, of the maximum extent of the curved effective areas in the cross-sectional plane. In this case, the curved effective areas are, so to speak, interlaced, or in other words, the web areas have a negative width.

For example, an existing, for example plane or differently shaped, side surface of the substrate body can be restructured. For this purpose, the substrate material can be influenced in successive curved effective areas along the existing side surface. If this has not yet been done, further measures can be taken to remove the influenced material and to fully form the distinguished surface.

If, as in the present case, several (identical) curved effective areas are used for structuring the surface, the distinguished surface is determined or influenced equally at several regions by the curved effective areas. Therefore, the distinguished surface, too, has the same first curved progression everywhere there.

In one embodiment, the first curved progression can be found multiple times or continuously at the distinguished surface. For example, multiple curved effective areas that have been spaced apart from each other in a non-overlapping manner can be used to structure the distinguished surface. Then, preferably, the first curved progression can be found at the distinguished surface wherever a curved effective area has acted.

For example, for the structuring of the distinguished surface also several curved effective areas can be used, which have been spaced overlapping to each other. In particular, the overlap can be chosen to be very strong, for example between 0.1% and 80%, preferably between 0.1% and 20%, preferably between 0.1% and 5%, preferably between 0.1% and 1%, of the maximum extent of the curved effective area in a plane perpendicular to the major direction of extension of the curved effective area. Then, preferably, at the distinguished surface, the first curved progression can be found continuously. This is because with increasing overlap, at any point of the distinguished surface, only the part of the curved effective area extending furthest outwardly increasingly determines the shape of the distinguished surface.

In one embodiment, the first curved progression extends perpendicular to the progression of the mutually spaced curved effective areas.

For example, a recess, in particular a rectangular or round recess, can be cut out of the, for example cuboid, substrate body. Then, two parts are present, on the one hand the substrate body with a recess and on the other hand the cut-out part. For this purpose, the substrate material can be influenced in successive curved effective areas along a curve (definable in a cross-sectional plane of the substrate body), for example a rectangular or circular curve. If not already done, further measures can be taken to remove the influenced material. By removing the influenced material, whenever, the distinguished surface can be fully formed and, since there is no longer a connection between the substrate body and the cut-out part, the latter can be separated from the substrate body.

According to one definition, the part from which a recess has been cut out can be the structured substrate body. According to another definition, the part that has been cut out of the substrate body to be structured can be the structured substrate body.

Quite analogously, a substrate body can be separated along a planned surface, and thus the distinguished surface can be formed by influencing the substrate material in successive curved effective areas along a straight or arbitrarily shaped curve (definable in a cross-sectional plane of the substrate body). Furthermore, this allows the possibility to control and adjust the progression of the separation surface along its major direction of extension in a very flexible way.

It is not necessary for the entire distinguished surface to be determined or influenced by the shape of one or more curved effective areas. For example, the substrate material influenced within two adjacent curved effective areas can ultimately have been removed, thus introducing two cavities into the substrate body. The surface exposed by connecting the two cavities, i.e., by removing the wall material between them, can also be part of the distinguished surface.

Alternatively or additionally, it can also be provided that the influencing of the substrate material comprises changing, in particular increasing or decreasing, one or more material properties, such as in particular the refractive index, the etch rate and/or the density, of the substrate material at least in certain areas, and/or that the influencing of the substrate material comprises at least partially removing and/or displacing the substrate material from the curved effective area, in particular compacting the substrate material into the surrounding substrate material.

By changing the substrate material in its material properties during the influencing process, it is possible to specifically select the substrate material that is to be removed, for example with further measures, in order to form the distinguished surface or parts thereof. Furthermore, the material properties can preferably be used to ensure that, depending on the degree of influencing, the influenced material can be removed with further measures at different rates by applying a measure. Thus, the selectivity with which the influenced material reacts to the further measures can even be spatially adjusted.

In any case, the distinguished surface can be well identified by the different properties of the material and can then be exposed by suitable measures. Here, such measures are particularly preferred which have a different effect on the areas with different material properties. Thus, if a measure acts only on the influenced substrate material, this can be selectively processed, such as removed, after the influencing. When the influenced substrate material is removed, the substrate body has a new surface there as at least part of the distinguished surface. This new surface is determined or influenced by the curved shape of the influenced area or areas.

By immediately removing or displacing the substrate material during the influencing process, the structuring of the distinguished surface can be carried out very efficiently. Further measures are no longer be necessary. Then the new surface created after the influencing is the same as the distinguished surface or a part thereof. Of course, it is also conceivable that further measures are nevertheless taken, so that the new surface after the influencing represents the distinguished surface or parts thereof only after the application of further measures.

By compacting the removed material into the substrate body, an increased strength of the distinguished surface can be achieved. This can be explained by the fact that the compacting makes the substrate material in the region of the surface to be structured denser and thus more resistant.

Alternatively or additionally, it may also be provided that the distinguished surface is formed by at least partially removing the substrate material by the influencing and/or by at least partially removing at least the influenced substrate material by at least one subsequent etching process, in particular wet-chemically, by means of an acid and/or by means of a caustic solution, wherein preferably a caustic potash solution is used as etching medium.

The influenced substrate material can be removed by an etching process, which is preferably carried out after the influencing. This makes it possible to provide the distinguished surface in a particularly efficient and targeted manner. Thus, an etching technique and/or an etchant can be selected, by means of which the influenced substrate material can be removed in a targeted manner. For example, the influenced substrate material can be etched away completely or partially. The uninfluenced substrate material, on the other hand, remains. Alternatively, a portion of the uninfluenced substrate material can also be etched away in certain areas.

In one embodiment, the etching process comprises an isotropic etching of the substrate body, in particular of the influenced and/or uninfluenced substrate material.

In one embodiment, the etching process comprises wet and/or dry etching of the substrate body, in particular of the influenced and/or uninfluenced substrate material.

Here, an etching process in combination with the use of several curved effective areas and thus influences of the substrate material is particularly effective. In this way, the substrate material can be influenced in several curved effective areas. In this way, the individual curved effective areas can be separate from one another, i.e. not initially be connected to one another. For example, the individual effective areas can be arranged parallel to one another and spaced apart in one direction. An etching process can then be used to remove the areas with influenced substrate material. By continued etching, the substrate material in the region between two effective areas, i.e., the uninfluenced substrate material, can be removed by the etching process, too. This allows a connection to be established between the individual (etched to be exposed) effective areas.

For example, if the multiple effective areas, and thus the influences extend from one side to another side, this simultaneously results in a separation of the substrate body into two parts.

If the multiple effective areas and thus the influences extend from one side to another side, this leads, for example, merely to the formation of an outer surface of the substrate body if the effective areas extend close to the former substrate edge surface or even terminate therewith.

Thus, since at least the influenced substrate material is removed by the etching process, it is also possible that uninfluenced substrate material is removed by the etching process.

If the influence penetrates at least one substrate surface of the substrate body (that is, if an influence reaches at least one substrate surface), the influenced substrate material can be etched out of the substrate body by means of so-called laser-selective etching, for example (so-called non-isotropic etching). This takes advantage of the fact that the influenced areas of the substrate material are etched out of the substrate material faster than uninfluenced areas during the etching process, such as in particular wet chemical etching. In the case of one-sided penetration, in addition to the uniform removal of substrate material from all substrate sides, a cavity (i.e., a one-sided opening) is created in the region of the influenced substrate material because the laser-modified region is etched faster than the surrounding substrate material. If the influenced area even penetrates two surfaces, in particular surfaces opposite to each other, moreover, a curved through hole ("via") can be created in this way. Preferably, such a curved through hole can be used as a base for producing an interposer by a subsequent metallization process.

In one embodiment, the curved effective area penetrates at least one of the surfaces of the substrate body, such as a first and/or a second top surface.

In preferred embodiments, the subsequent etching process therefore comprises laser active etching of at least the influenced substrate material.

For example, hydrofluoric acid (HF), sodium hydroxide (NaOH) and/or a potassium hydroxide solution (KOH) can be used as the etching medium for the laser selective etching.

Preferably, the etching process is performed in an acidic and/or alkaline etching medium.

Preferably, the etching process is carried out until the connection of those areas from which influenced substrate material has been removed.

Preferably, the etching process is carried out until the influenced areas are connected.

With increasing average process power and thus pulse energy of the electromagnetic field (for example of a laser used), the influence created (for example by the laser or its line focus) no longer consists entirely or partially in the change of density and refractive index of the substrate material, but also, for example, in a cavity introduced into the substrate material, preferably emerging outwardly on one or more sides. In this context, an outwardly emerging cavity means that the cavity is accessible from the outside. If it emerges outward on one side, it is accessible from one opening. If it emerges outwardly on two sides, it is accessible from two openings.

In the presence of such an outwardly emerging cavity as a result of the influencing, the etching medium can penetrate there and, in an isotropic etching process, simultaneously remove substrate material from all surfaces of the substrate body, in particular also from the surface of the cavity created, thus increasing the diameter of the cavity. For example, a potassium hydroxide (KOH)-based etching process is used for this purpose. A special feature of the basically etched substrate surface, such as a glass surface, is that the surface is formed in the form of calotte-shaped recesses.

A cavity can, for example, be introduced in the form of a curved hole in the substrate material, which then emerges, for example, on two opposite sides to the outside. Preferably, an etching process is used to widen the curved hole. This can be the same etching process that was previously used to remove the influenced material and which then, as part of the continued etching process, also seamlessly removes the uninfluenced material. Preferably, the etching process is then continued until adjacent cavities are connected to one another.

In one embodiment, the influenced substrate material is etched non-isotropically at least in certain areas and/or at times.

In one embodiment, the influenced substrate material is etched isotropically at least in certain areas and/or at times.

In one embodiment, the substrate material is influenced and subsequently at least the influenced substrate material is etched away non-isotropically to thereby form cavities, in particular through holes, within the substrate body. Optionally, by further etching, uninfluenced substrate material between the through holes can also be etched away, at least in certain areas, to thereby connect the through holes to each other, at least in certain areas. These connecting surfaces can then also be part of the distinguished surface.

It can particularly preferably be provided that the distinguished surface is modulated in height at least in certain areas. For example, it can be calotte-shaped at least in certain areas. This is achieved by exposing the distinguished surface both by removing (for example etching away) influenced substrate material and by removing (for example etching away) uninfluenced substrate material.

This height modulation has been shown to be beneficial in that it contributes to an increased strength of the distinguished surface. Thus, it is preferred in embodiments that the distinguished surface has a calotte-shaped structure, such as calotte-shaped recesses, at least in certain areas.

In one embodiment, if there are a plurality of successive areas with influenced substrate material, the etching process is carried out until the influenced areas are not only opened (i.e., the influenced material there has been etched away), but also connected. Then the two substrate parts, for example as inner and outer parts, can be separated from each other without force and as a whole.

Alternatively or additionally, it can also be provided that the electromagnetic field is provided in the form of and/or by a curved line focus, in particular of a laser beam, and/or the curved effective area is determined by the shape of the line focus.

It is a particularly efficient way to provide the electromagnetic field in the form of a curved line focus. This is because a line focus can be formed in particular by use of a laser very easily and in many different shapes.

A laser beam whose line focus is used can be directed and controlled along an optical path by known means. The line focus can be adjusted and adapted by various means, such as optical elements. Thus, an electromagnetic field can be generated within the substrate body and can assume any spatial shape which is achievable by use of beam shaping and beam influencing. Accordingly, a nonlinear interaction with the substrate material can be generated in suitably shaped regions of the substrate body, too.

A laser beam with line focus thus represents an extremely flexible means of achieving a nonlinear interaction between the electromagnetic field and the substrate body in the curved effective areas, in particular to achieve a nonlinear absorption.

When processing substrate bodies by means of lasers, a general distinction must be made between processes of linear and nonlinear absorption. Linear absorption occurs when the material to be processed is partially or completely absorbent for the wavelength of the laser used (e.g.: absorption of $CO_2$ laser radiation in glass), so that the strength of the interaction can be adjusted accordingly via laser wavelength, energy, pulse duration and the like. To be distinguished from this are the processes of nonlinear absorption, in which the material to be processed initially shows no absorption in the area of the laser radiation used, i.e. it is transparent to the laser wavelength(s). However, by generating so-called ultrashort laser pulses (typical pulse lengths here are in the range of 10 ps to 100 fs, in particular in the range of 1 ps to 100 fs), sufficiently high electromagnetic fields are generated in the substrate material by the laser, which cause a nonlinear change in material properties of the substrate body or its material, such as the refractive index, and thus in the absorption properties of the material. If threshold values characterizing the material are exceeded, the laser beam produces a permanent effect in the material. The resulting local changes in the material extend from permanent changes in the refractive index, change in the etching behavior (selective laser etching) up to the creation of cracks and channels in the substrate, respectively depending on the interaction of the laser and material parameters and restricted to the area of the laser focus formed in the material.

For example, the critical intensity for a glass substrate for causing a nonlinear change in material properties therein is at least $10^{13}$ W/cm$^2$.

In one embodiment, the substrate material comprises glass and the electromagnetic field has a field intensity of at least $10^{13}$ W/cm$^2$, preferably of at least $5\times10^{13}$ W/cm$^2$, preferably of at least $10^{14}$ W/cm$^2$, most preferably of at least $5\times10^{14}$ W/cm$^2$. Optionally, the electromagnetic field has a field strength of at most $10^{16}$ W/cm$^2$.

In one embodiment, the curved effective area corresponds to the region where the line focus of a laser causes a nonlinear interaction with the substrate material, wherein the nonlinear interaction preferably comprises and/or represents a nonlinear absorption, thereby influences the substrate material.

Due to the presence of the line focus, an electromagnetic field also exists in the curved effective area in question, which causes the nonlinear interaction.

In one embodiment, a nonlinear interaction between the electromagnetic field and the substrate material occurs within the entire curved effective area.

In one embodiment, the electromagnetic field corresponds to the line focus.

Alternatively or additionally, it may also be provided that the laser beam is provided by an ultrashort pulse laser, that the phase of the laser beam is adjusted and/or adapted, in particular by means of a spatial light modulator, of a diffractive optical element and/or a combination of several cylindrical lenses, that the laser beam is focused onto the substrate body, preferably by means of a microscope objective or a Fourier lens, wherein said focusing preferably takes place after adjusting or adapting the phase of the laser beam, and/or forms the line focus, that the line focus is that of an accelerated laser beam, in particular an Airy beam, that the wavelength of the laser beam is 1064 nm, the microscope objective or the Fourier lens has a focal length of 10-20 mm, the coefficient of the cubic phase (laser parameter beta) has a value between $0.5\times10^3$/m and $5\times10^3$/m, the diameter of the raw beam (laser parameter $\omega_0$) has a value between 1 mm and 10 mm, preferably between 2.5 mm and 5 mm, the pulse duration (laser parameter c) has a value of 0.1-10 ps, the pulse energy (laser parameter Ep) has a value between 1 and 1,500 µJ, preferably between 30 and 500 µJ, in particular 474 µJ, and/or the number of pulses in the burst (laser parameter N) has a value between 1 and 200, preferably between 1 and 100, in particular between 1 and 8, that the spatial extent of the curved effective areas, preferably its length and/or one of its diameters, is set and/or changed over time by varying the average power range of the laser and/or by changing the phase, in particular different extents are set for at least some of the plurality of curved effective areas, and/or that the spatial orientation of the curved effective areas is set and/or changed over time by varying the tilting of the optical axis of the laser beam relative to the normal to the substrate surface, in particular that substrate surface at which the laser beam impinges onto the substrate body, in particular different orientations are set for at least some of the plurality of curved effective areas.

The phase of the laser beam can influence the spatial shape of the electromagnetic field of the line focus and thus adjust and adapt the curved effective area. Therefore, a spatial light modulator (SLM), a diffractive optical element, and/or a combination of multiple cylindrical lenses, all of which can adjust the phase of the laser beam, are suitable means to control the spatial shape of the electromagnetic field.

A possible setup for generating a curved effective area according to the disclosure and, for this purpose, a correspondingly spatially shaped electromagnetic field can, in principle, be configured as follows: The laser beam of an ultrashort pulse laser impinges on a spatial light modulator (SLM), which changes the phase of the incident laser pulse by imparting a phase, such as a cubic phase. The beam is then focused through a microscope objective and/or a Fourier lens onto the substrate body to be structured. Depending on the phase distribution which forms downstream the spatial light modulator, the imaging lens now no longer generates a straight, but a curved focal line, which leaves a spatially curved influence of the substrate material in the substrate body. In one embodiment, the secondary maxima of the Airy beam can also be suppressed. In this case, the intensity ratio of the main focus to the rest of the beam can be optimized (1.2-10). This can be realized, for example, by non-radial symmetric apodization in the Fourier plane by means of an aperture.

In a preferred embodiment, instead of using a spatial light modulator to selectively change the phase distribution, a diffractive optical element (DOE) is used to generate the curved effective areas. For example, this has a diameter of 5-15 mm, preferably 9 mm, wherein the DOE is located in the "front focal plane" of the microscope objective or Fourier lens. Preferably, the SLM or DOE (i.e., generally speaking, the phase mask) has a working distance from the corresponding lens which is equal to the focal length of the lens and/or between 2-15 mm, preferably 5 mm. In such cases, if the "front focal plane" of a microscope objective is within the objective itself, preferably the minimum (constructional) distance is to be selected. In an SLM, an analog setup can be provided, for example a 2f setup. Another embodiment uses a combination of multiple cylindrical lenses to generate the phase in the laser beam, such as in particular a cubic phase, instead of a spatial light modulator or a diffractive optical element.

For example, an Airy beam can be used in the present case. An Airy beam is particularly well suited for asymmetric/lateral beam supply.

For example, a value of 300 µJ can be selected as the pulse energy (laser parameter Ep), a value of 2 can be selected as the number of pulses in the burst (laser parameter N), and/or a value of 5 ps can be selected as the pulse duration (laser parameter c). Optionally, the focal length of the optics can be f=10 mm, and/or a ×2.0 beam expander (especially for an input Gaussian beam with a diameter of 10 mm) can be provided.

An Airy beam can also be generated particularly easily and efficiently. For example, an Airy beam can be obtained as an image of a beam with cubic phase generated either directly by a phase mask (DOE or SLM) or a setup with cylindrical lenses.

In this way, by suitable selection of the optical setup (in particular determination of the vertical distance between focusing optics and the substrate material to be processed, i.e. the focal position and length), curved effective areas in the interior or also one of the two or both large surfaces (base and/or top surface) can be produced penetratingly in the substrate material.

Preferably, to generate a line focus, in particular of an accelerated beam, an SLM, a DOE and/or a lens optics is used either as a single component or as an array of lenses, such as cylindrical lenses, in order to impart a suitable phase function onto the laser beam.

In one embodiment, curved effective areas are arranged along a closed contour at a predetermined distance from each other (i.e., with a so-called pitch), for example with a spacing between 1 µm and 50 µm, preferably between 1 µm and 10 µm, between 10 µm and 30 µm, between 20 µm and 40 µm, or between 30 µm and 50 µm, in the substrate material. Spacings of 1 µm, 20 µm or 50 µm are preferred. Here, preferably by tracking the optics (mechanically tracking the DOE or changing the phase distribution by software), the orientation of the modifications can be controlled in such a way that a convex distinguished surface is created without tilting the inscribed structures or at least at a constant angle. Such curved effective areas allow, for example, the definition of a new outer contour in a substrate body, such as a raw glass substrate. Here, optionally, the excess material can be removed along the intended contour—possibly using auxiliary cuts.

In one embodiment, the beam orientation is tracked at a constant angle relative to the intended contour, preferably mechanically in DOE and by software in SLM.

In one embodiment, the structuring sequence of surfaces is controlled to prevent unwanted interaction, such as in particular shadowing. An advantageous interaction between successive influences is possible so that a preferred direction along the target contour can be set.

An Airy beam offers preferential characteristics for the provision of electromagnetic fields.

The nonlinear interaction can be specifically adjusted in its spatial extent and/or strength by selecting suitable laser parameters.

In general, when structuring surfaces that face outward or inward (inner and/or outer surfaces), it is preferred that the orientation of the laser optics allows for the formation of a convex first curved progression inward (when structuring an inner surface) or outward (when structuring an outer surface). Moreover, the combination of inner and outer surfaces is possible with the method, in particular also in a single implementation.

In embodiments, the specific shape of the curved effective areas or of the influenced substrate material is determined or determinable by the phase imparted by SLM and/or DOE.

It has been found to be particularly effective that the spatial extent of the curved effective area and thus of the influence of the substrate material is adjusted by the average power range of the laser.

By varying, in particular increasing, the pulse energy of the laser pulse, the laser power then exceeds a threshold value of the substrate material in a larger area of the curved focal line.

Thus, the length of the curved effective area or influence can be adjusted.

For example, different lengths of the curved effective areas and thus of the influences in a substrate material, such as glass, can be achieved by varying a 10 ps laser pulse in the medium power range of the laser (for example, with a power between 1 W and 500 W, preferably between 1 W and 40 W, in particular between 2 W and 10 W, 10 W and 20 W, 20 W and 30 W or 30 W and 40 W, and/or pulse energies between 1 µJ and 500 µJ, preferably between 30 µJ and 300 µJ) and/or by phase changes with the spatial light modulator.

Curved effective areas or influences can be generated, in particular by the means mentioned above, for example with lengths of more than 0.1 mm up to more than 3 mm, preferably between 0.1 mm and 5 mm, in particular between 0.5 mm and 3 mm, and/or a maximum deflection from the straight focal line of 200 µm, preferably between 10 µm and 80 µm, in particular between 20 µm and 80 µm. The curvature progression of the influence, and thus ultimately also the first curved progression of the distinguished surface, is determined or influenced by the shape theoretically predeterminable by the phase function used.

In one embodiment, therefore, the curved effective area is adjusted in its length and/or changed in time by varying the pulse energy of the laser pulse.

The extent of the electromagnetic field and thus the spatial extent of the curved effective area can be influenced in a particularly targeted manner if the average power of the pulse is adjusted. The same applies to phase changes.

For example, a higher power leads to a longer length of the curved focus. Therefore, the power can be used targetedly and/or controlled in order to adjust the focus and thus the curved effective area in its spatial extent.

For example, a stronger cubic phase results in a longer and more curved focus. Therefore, this phase can be targetedly used and/or controlled in order to adjust the focus and thus the curved effective area in its spatial extent.

Especially when the substrate material is influenced by the laser without being removed, a subsequent etching process is preferred in embodiments. Here, the etch removal and/or etch speed can be increased by performing the individual influences in the curved effective areas not with individual pulses, but with multiple pulses within a pulse group, i.e. by means of a so-called burst pulse. It is therefore preferred in embodiments that the ultrashort pulse laser performs several pulses within a pulse group as a burst pulse.

Thus, the proposed method enables to provide a substrate of predetermined (lateral) geometry (thickness) and a predetermined surface, in particular lateral surface, from a starting substrate, such as a glass or glass ceramic substrate. For this purpose, the substrate material of the starting substrate can be influenced along the planned surface, for example, by means of an ultrashort pulse (UKP) laser within curved effective areas of predetermined shape, and subsequently the influenced areas of the substrate material can be selectively etched and thereby removed. In particular, etching can be carried out until the areas defined in this way are connected, so that the two parts, for example the inner and outer parts, can subsequently be separated from each other without force.

Alternatively or additionally, it can also be provided that at least during the non-linear interaction at least one auxiliary substrate body is arranged at the substrate body and the respective curved effective area and/or the line focus extends at least partially into the auxiliary substrate body, wherein preferably two or more auxiliary substrate bodies are arranged at the substrate body, in particular on opposite sides of the substrate body, and the respective curved effective area and/or the line focus extends at least partially into two or more auxiliary substrate bodies.

Preferably, the auxiliary substrate body is made of the same material as the substrate body.

With such an auxiliary substrate body, ablation components or effects on the free substrate surfaces can be avoided or at least significantly reduced in the case of penetrating curved effective areas.

For example, in one embodiment, the substrate body to be structured can be processed together with a sprued-on, bonded-on and/or ultrashort pulse-welded auxiliary substrate body, so that during the processing initially only internal influences are generated and these are quasi exposed in a further process step (for example, describable as debonding) by removing the auxiliary substrate body.

By providing an auxiliary substrate body, a particularly targeted influencing of the substrate material can thus take place also in the surface-near area of the substrate body and in accordance with the specifications for the distinguished surface. This is because, due to the auxiliary substrate body, the curved effective area can also extend beyond the substrate body without impairing or significantly impairing the progression of the curved effective area. This ensures that the curved effective area does not deviate from the desired shape even in the surface-near area of the substrate body, and that the substrate material is spatially influenced according to the specification.

In particular, if the auxiliary substrate body and the substrate body are made of the same material, it is ensured that there is a seamless and, above all, offset-free transition of the curved effective area at the interface between the two bodies.

After the nonlinear interaction, the auxiliary substrate body or bodies can be removed from the substrate body. In this way the actual substrate body with influenced substrate material is exposed again.

In other words, when the auxiliary substrate body is removed again after the nonlinear interaction, a pure influence can be achieved in the substrate body up to the outer surface of the substrate body.

One or more auxiliary substrate bodies can be provided.

The auxiliary substrate body or bodies can surround the substrate body, quasi enclose it from one or more sides.

The auxiliary substrate body reliably prevents accumulations of substrate material in the edge region of the distinguished surface as a result of ablation effects.

Alternatively or additionally, it is also provided that at least one, preferably a plurality of and/or all of the, curved effective area of the at least one curved effective area is completely enclosed within the substrate body, in particular at least during the non-linear interaction, and wherein preferably the method further comprises removing at least in certain areas material from the substrate body, in particular along the major direction of extension of the curved effective area within the substrate body, and thereby making the substrate material influenced in the enclosed curved effective area at least partially and/or in certain areas accessible from the outside, wherein in particular the removal of material from the substrate body is carried out by means of etching.

Thus, due to the fact, that a curved effective area entirely lies within the substrate body, ablation components or effects on the—both original and obtained—surfaces of the substrate body can be reliably avoided.

With the proposed features, the non-linear interaction takes place only between the electromagnetic field and such substrate material, which lies inside the substrate body and which is therefore not accessible from the outside. As a result, the progression of the curved effective area is not impaired or not significantly impaired. This ensures that the curved effective area does not deviate from the desired shape, and that the substrate material is spatially influenced according to the specification.

Subsequently to the nonlinear interaction, substrate material can be removed from the substrate body until the influenced substrate material is reached (or even beyond). For example, a corresponding etching process has proven to be advantageous for this purpose, because it can be performed precisely and efficiently. In this way, a new surface, which is in particular different from the distinguished surface, for example at least a new, at least temporary, top surface of the substrate body, can be formed. By removing the substrate material, the influenced material area becomes accessible from the outside. This makes it possible, for example, to subsequently remove the influenced substrate material in order to form the distinguished surface as described elsewhere.

In this way, very reliably defined influenced material areas can be obtained in the substrate that extend up to the surface of the finally processed substrate body. In turn, this also allows a clean distinguished surface to be realized.

For example, by removing material from the substrate body at least one, preferably both, top surfaces of the substrate body are altered. Here, so as to speak, a displacement of the top surface can take place, for example along the major direction of extension of the curved effective area.

The major direction of extension of the curved effective area can, for example, extend perpendicular to an original and/or modified top surface of the substrate body.

Alternatively or additionally, it is also provided that the substrate material is exposed to the electromagnetic field successively or wholly or partially in parallel in each of the plurality of curved effective areas, that the entire substrate material within a curved effective area is simultaneously exposed to the electromagnetic field, that the curved effective areas each have a maximum deflection from a straight progression of more than 20 µm, more than 40 µm, more than 60 µm, more than 80 µm or more than 100 µm, and/or that the length of the curved effective areas is respectively more than 0.1 mm, more than 0.3 mm, more than 0.5 mm, more than 0.7 mm, more than 1 mm, more than 3 mm or more than 5 mm.

If the substrate material is exposed to the electromagnetic field successively at the individual curved effective areas, and thus the substrate material is influenced sequentially in the individual areas, the structuring can be prepared or carried out with little technical effort. If the electromagnetic field is then provided, for example, by means of a line focus of a laser, only a single laser needs to be provided. By relative movement of the substrate body and the line focus, the line focus can then very easily be formed successively in the different curved effective areas and the substrate material can be influenced there.

If the substrate material is exposed to an electromagnetic field in several curved effective areas (or even in all of them) at the same time, the influencing of the substrate material can be carried out very time-efficiently and thus the structuring can be prepared or carried out in reduced time. Thus, several lasers can respectively form a line focus in parallel at the different locations in the substrate material and thus the substrate material can be influenced in parallel in several curved effective areas.

In addition, the substrate body can then be moved relative to the multiple line foci when the influencing of the substrate material in the corresponding curved effective areas is completed. In this way, the substrate material can be respectively influenced sequentially at several points in parallel. This enables a particularly efficient way of structuring. In particular, the procedure scales for larger substrates or for more extensive structuring processes. For more extensive tasks, several curved effective areas can be formed in parallel, for example by adding further lasers, which respectively form further line foci in the substrate material.

In the case of a laser, the line focus is formed in the substrate material and thereby the curved effective area is determined. That is, the area in which the line focus causes an electromagnetic field within the substrate material is the curved effective area. In particular, it is the part of the electromagnetic field that produces a nonlinear interaction with the substrate material.

Of course, it is conceivable that the line focus also exists partially outside the substrate body, for example in a medium at least partially surrounding the substrate body, such as a fluid, for example air or a liquid, and/or in an auxiliary substrate body. Then, however, an electromagnetic field nevertheless also exists inside the substrate body, so that a curved effective area can be defined in the substrate body, even if the curved effective area also continues in the other medium.

Due to the flexibility of the process, curved effective areas can be created with respectively adapted curvature and/or length. Thus, the curvature or length can be smaller or larger, depending on how the planned surface is to be structured.

A curved effective area is preferably formed three-dimensionally in the substrate body. A curved effective area preferably has a major direction of extension within the substrate body. A center axis can be laid through a curved effective area and can itself have a curved progression. The length of this center axis corresponds to the length of the curved effective area. This center axis has a beginning and an end in the substrate material. Preferably, the beginning and the end are respectively disposed on a surface of the substrate body, for example, in the intersecting surfaces between the substrate body and the curved effective area. The maximum deflection of the curved effective area is the maximum distance that a point on the center axis can be spaced from a point on a straight connecting line between the beginning and end of the center axis.

The spatial shape of the curved effective areas and thus the spatial shape of the influenced substrate material, i.e. the configuration of the distinguished surface, depends on or can be co-determined by this maximum deflection, which can also be referred to as the profile stroke.

For the adjustment of the maximum deflection or the profile stroke, the numerical aperture $A=n*\sin(ALPHA)$ of the focusing optics can be set and/or adjusted. In general, the larger the numerical aperture of the focusing optics is selected, the shorter the length of the formed focus and—in the exemplary case of an Airy beam—the higher the curvature of the Airy beam near the focus.

For the curved effective area or the distinguished surface, this means that with decreasing thickness of the substrate body, the local curvature must be increased in order to generate an appreciable profile stroke at the distinguished surface.

Accordingly, the process can be used for processing/structuring thin substrate bodies. This is especially true for the structuring of their lateral surface.

Thin substrate bodies preferably have a substrate thickness of 500 μm or less, of 300 μm or less, or of 100 μm or less, preferably in the range of 30 μm to 100 μm. Optionally, thin substrate bodies have a substrate thickness of 0.1 μm or more, of 1 μm or more, of 10 μm or more, of 50 μm or more, or of 100 μm or more.

While substrate bodies in the thickness range greater than 1 mm can be mechanically clamped and their lateral surfaces can be polished by use of conventional methods, this is conventionally not possible with thin substrate bodies because of their (mechanical) instability and the risk that the thin substrate bodies will be destroyed during polishing by cracks extending inwardly from the lateral surface as a result of the imparted mechanical stress.

It is only the present method that makes it possible for the first time to structure the surfaces of even thin substrate bodies, in particular with a thickness of 500 μm or less, in particular without exerting force and therefore without the risk of destroying or negatively affecting the substrate body. In particular, the surfaces are a lateral surface of the substrate body, preferably a circumferential lateral surface.

In one embodiment, the numerical aperture of the optics used to focus the laser is adjusted depending on the thickness of the substrate material in order to preferably be able to structure a lateral surface of a substrate body having a thickness of 500 μm or less and/or a thickness of 0.1 μm or more as a distinguished surface.

In one embodiment, the distinguished surface can have an adjustable slope. Optionally, this is achieved by means of an offset and/or tilted, in particular vertically offset or tilted, Airy beam.

Here, preferably, an Airy beam is used whose beam center moves parallel to the optical axis/perpendicular to the substrate surface, such as a glass surface (angle of zero degrees) and which is symmetrically distributed (along the propagation direction/substrate thickness) around the center of the substrate. That is, the beam has reached its maximum deflection exactly there (focus position). In the case of the offset (non-tilted) Airy beam, the focus (and the point of maximum deflection) is placed off the center (along the thickness of the substrate) of the substrate. In the case of the tilted Airy beam, the optical axis (as the trajectory of the beam center) is not parallel to the normal of the substrate surface.

In one embodiment, an existing surface, in particular lateral surface, of the substrate body is chamfered, in particular with multiple passes.

In one embodiment, the laser beam is an Airy beam.

In one embodiment, a combination of inner and outer surfaces is structured, preferably for use as a glass hinge for use in a flexible mobile device. This is understood to mean a structured, mostly strip-shaped glass substrate with a maximum thickness of 200 μm, preferably 100 μm or less, particularly preferably 20 μm, consisting of a central structured area extending between 2 opposing edges of the substrate and two adjacent non-structured areas. The recesses of the structured area created according to the method allow the reproducible bending about a bending axis perpendicular to the orientation of the glass strip.

Alternatively or additionally, it is also provided that
(i) the substrate body is transparent, is made of glass, comprises a first top surface and/or comprises a second top surface which preferably extends parallel to and/or is arranged opposite the first top surface,
(ii) the thickness of the substrate body, preferably measured between the first and second top surfaces, is 500 μm or less, preferably 400 μm or less, more preferably 300 μm or less, more preferably 200 μm or less, more preferably 100 μm or less, more preferably 70 μm or less, more preferably 50 μm or less, more preferably 30 μm or less, most preferably 10 μm or less and/or
(iii) after structuring the distinguished surface
1. the distinguished surface extends between the first and second top surfaces,
2. the distinguished surface is connected to the first and/or the second top surface at least in certain areas,
3. at least one part of at least one lateral surface, preferably a circumferential lateral surface, of the substrate body comprises the distinguished surface,
4. at least one part of a surface of a through hole, which preferably extends from the first top surface to the second top surface, comprises the distinguished surface, and preferably the through hole is formed by influencing and/or etching the substrate material,
5. at least one surface area of a cavity of the substrate body comprises the distinguished surface, wherein the cavity is preferably accessible from the outside or is completely enclosed in the substrate material, and wherein preferably the cavity is formed by influencing and/or etching the substrate material,
6. the distinguished surface represents at least in certain areas an inwardly facing surface of the substrate body, and/or
7. the distinguished surface is at least in certain areas an outwardly facing surface of the substrate body.

Previous methods could only achieve insufficient results with regard to the efficiency and the strength of the formed surface, especially with transparent substrate bodies. With the present method, even surfaces of transparent substrate bodies can be reliably structured.

A first and a second top surface enable a reliable influence of the substrate material, since the top surface clearly delimits the substrate body.

In one embodiment, the first and/or second top surfaces are planar.

In one embodiment, the substrate body is cuboidal.

In one embodiment, the substrate body is transparent and comprises a first top surface, a second top surface and a circumferential lateral surface that is curved at least in certain areas along the thickness direction of the substrate body.

The method is particularly well suited for structuring surfaces of thin substrate bodies, that is, substrate bodies whose thickness is small. And in particular for structuring surfaces that have an extension direction along the thickness of the substrate body, such as a, preferably circumferential, lateral surface of the substrate body.

For example, a cuboid substrate body can have a small thickness. Then even its lateral surface, or a portion thereof, can be structured by use of the present method, although it can have only the small dimension corresponding to the small thickness in one direction. Optionally, the lateral surface is a circumferential lateral surface.

In the present application, substrate bodies are preferably considered to be thin or to have a small thickness when the thickness of the substrate material is 500 µm or less and/or 10 µm or more.

When the distinguished surface is connected to at least one of the top surfaces, a particularly seamless transition between the existing surface and the structured surface can be produced. This enables a very stable substrate body.

For example, a lateral surface of the substrate body, such as a circumferential lateral surface, can be structured, that is, formed, by the present method. Then the distinguished surface is a part of this circumferential lateral surface.

The method can be used in a particularly versatile manner. For example, when a curved effective area extends from one surface area (for example, a top surface) to another surface area (for example, to the other top surface), and thus correspondingly the influenced substrate material, a through hole can be created from the one to the other top surface (in general: surface area) by structuring the distinguished surface. For example, when a curved effective area extends into the substrate material from one surface area of one top surface (for example, one surface area) without extending to the other surface of the substrate body (for example, the other top surface of the substrate body), and thus correspondingly the influenced material also extends into the substrate material from one surface area, a cavity can be created in the one surface (in general: top surface) by structuring the distinguished surface. If the influenced substrate material does not extend up to the outside, even a completely enclosed cavity can be created in the substrate body by structuring the distinguished surface.

Apart from the case of the enclosed cavity, the influenced material can optionally be removed directly by the influencing and/or by, for example, a subsequent etching process.

The present method can be used, for example, to cut out a circular opening from a thin cuboid substrate body by structuring a distinguished surface having a circular contour in at least one cross-sectional plane lying in the thickness region of the substrate body.

For example, the present method can be used to structure an outer lateral surface of a thin cuboid substrate body, for example, be formed in a convex or concave shape.

In one embodiment, the structuring of the distinguished surface comprises convexly shaping an outer lateral surface of a substrate body, in particular a thin, cuboid substrate body.

Alternatively or additionally, it is also provided that after the structuring of the distinguished surface, the first curved progression of the distinguished surface extends perpendicularly to the major direction of extension of the distinguished surface, and/or that in the major direction of extension of the distinguished surface, in particular in the circumferential direction of the substrate body, the distinguished surface comprises at least in certain areas a second curved progression.

If a lateral surface of a round or cuboid substrate body is structured and thus represents the distinguished surface, the lateral surface can have a curvature along the thickness of the substrate body, wherein the curvature is co-determined or determined at least in certain areas by the curvature of the curved effective area. This is the first curved progression. And this extends perpendicularly to the major direction of extension of the lateral surface of the substrate body, which represents, for example, a circumferential lateral surface.

In the case of the round substrate body, the lateral surface accordingly also extends curved, around the substrate body, which here represents the second curved progression.

In one embodiment, by rotating the line focus by 180°, preferably about at least one axis which extends in particular parallel to the major direction of extension of the line focus, a first curved progression which is concave or convex at least in certain areas can be set.

Alternatively or additionally, it is also provided that after the structuring the distinguished surface in at least one cross-sectional plane of the substrate body the distinguished surface has a contour which, along the first curved progression
  (i) is at least in sections convexly or concavely curved,
  (ii) corresponds at least in sections to a contour of the curved effective area,
and/or
  (iii) comprises at least in sections a parabolic progression, a quartic progression, a logarithmic progression, a progression according to a polynomial function of degree n, preferably with even n, in particular with n=6, n=8, n=10 or n=12, and/or a C-shaped profile.

The line focus can assume a variety of shapes by adjusting corresponding phases and thus form a variety of three-dimensional effective areas and influence the substrate material therein. For example, the substrate material can be influenced in several adjacent effective areas in order to subsequently obtain the distinguished surface as a new lateral surface of the structured substrate body. Here, the curved effective area can be selected in such a way that the curvature protrudes into the substrate material of the substrate body desired after structuring, in order to obtain a concavely shaped distinguished surface. Or, the curved effective area can be quasi rotated 180 degrees in order to obtain a convexly shaped distinguished surface.

This makes it particularly easy to use the present method for structuring differently shaped distinguished surfaces.

Different characteristics of a convexly curved top/lateral surface can be advantageous depending on the subsequent application: for example, a parabolic/cubic phase enables a top/lateral surface that is close to the C-cut of the top/lateral surface commonly used in the glass industry, whereas a quartic phase function rather corresponds to the top/lateral surface that is chamfered to the top and bottom side (rather than a top/lateral surface with a continuously curved shape). Various asymmetric top/lateral surface shapes can also be realized by tilting the beam axis and/or shifting the focus with respect to the substrate body. Such top/lateral surfaces are used, for example, when an auto-centering effect becomes relevant in the application of the substrate body.

Likewise, it is possible to process the top/lateral surface of thicker glasses in certain sections in several passes.

The object is achieved according to a second aspect of the disclosure in that a substrate body, comprising at least one first top surface and at least one distinguished surface, in particular produced or producible by a method according to the first aspect of the disclosure, wherein the distinguished surface comprises, at least in certain areas, at least one first curved progression, wherein the first curved progression lies in a cross-sectional plane of the substrate body which is spanned by a plane having at least one normal vector of the distinguished surface and a normal vector of the top surface, wherein the first curved progression can be described, at least in certain areas, by a parabolic, quartic, logarithmic and/or polynomial phase function, wherein the substrate body has a thickness of 500 µm or less is proposed.

For the first time, a substrate body is provided which, despite its small thickness, has a surface, namely the distinguished surface, which is structured with a curved contour in the cross-sectional plane.

Especially for surfaces which represent a lateral surface of the substrate body, this has not been possible so far.

This is because substrate bodies that have a thickness of 500 µm or less show a tendency to bend under their own weight when clamped. This behavior is quite similar to that of a sheet of paper. Therefore, such substrate bodies are also called microsheets.

Because of this behavior, such thin substrate bodies could previously not be clamped mechanically in order, for example, to be able to carry out the conventionally necessary polishing measures of a machined surface. Since the method according to the disclosure already provides distinguished surfaces of high quality by itself, no polishing measures are necessary.

The electromagnetic field can also be formed within a very thin substrate body, and the substrate material can be influenced there accordingly. This means that even very sensitive, since thin, substrate bodies with structured distinguished surfaces can be reliably provided. This is optimal for microsheets.

The substrate body preferably has a substrate thickness of 400 µm or less, 300 µm or less, 200 µm or less, 100 µm or less, 50 µm or less, 20 µm or less, or 10 µm or less.

Preferably, the substrate body has a substrate thickness of 1 µm or more, 10 µm or more, 50 µm or more, or 100 µm or more.

In one embodiment, the narrow side of the substrate body has a spherical shape in the form of a C-cut.

In one embodiment, the curvature of the narrow side of the substrate extends at least along a direction and/or in certain areas according to a parabolic, polynomial, or logarithmic shape and/or is predetermined by the intensity profile of a quartic beam.

In one embodiment, the substrate body comprises at least one modification in the interior, wherein preferably a modification is a spatially restricted variation of the density and/or the refractive index of the substrate material, a cavity, a crack and/or a through hole in the substrate material, preferably provided with a shaped outer/inner contour and/or a taper angle. Optionally, the modification can be restricted internally by contours of various types, such as uncurved or curved. Furthermore, the modification can penetrate at least one, both, or none of the top surfaces of the substrate body.

In one embodiment, the roughness of the distinguished surface Ra is less than or equal to 5 µm, preferably less than or equal to 2 µm, more preferably less than or equal to 1 µm. For example, the roughness is an average roughness, preferably measured according to ISO 25178: 2016.

In one embodiment, the distinguished surface comprises a grooved structure.

In one embodiment, the substrate body comprises two or more layers and a curved lateral surface. Optionally, the substrate body can be machined with a functional component as a whole.

In one embodiment, the substrate body is made of or comprises glass, glass ceramic, silicon, or sapphire.

In one embodiment, the substrate body does not have accumulations of substrate material in the edge region of the distinguished surface.

Alternatively or additionally, it is also provided that the distinguished surface has a strength of at least 100 MPa, preferably at least 150 MPa, more preferably at least 200 MPa, wherein preferably the distinguished surface has been etched in whole or in part, in particular with hydrofluoric acid, sodium hydroxide, a caustic solution, such as caustic potash, and/or an acid.

The high strength of the distinguished surface makes the substrate body resistant to external influences acting on the distinguished surface, such as mechanical stress. This is a great advantage, especially for thin substrate bodies, because they can be stabilized in this way.

The method according to the disclosure provides such a distinguished surface. This is because the damages that occurs in conventional methods, such as microcracks or the like, do not occur in the proposed method, especially since these known methods are not even applicable to substrate bodies of the thickness under consideration here.

If the distinguished surface has been etched as a whole or in part, the strength can be increased once again.

Alternatively or additionally, it is also provided that the distinguished surface is at least in certain areas height-modulated, in particular has a wave-like and/or calotte-shaped structure, preferably along the major direction of extension of the distinguished surface and/or perpendicular thereto.

The height modulation can increase the strength of the distinguished surface. As a result, the substrate body is resistant to external influences acting on the distinguished surface, such as mechanical stress. This is a great advantage, especially for thin substrate bodies, since they can be additionally stabilized in this way.

Until now, it was not possible to provide such a height modulation safely and reliably, especially for lateral surfaces of thin substrate bodies. Due to the mechanical instability of the thin substrate bodies, the processes required for this, such as in particular grinding, could conventionally not be carried out on such substrates. With the proposed method, it is now possible to structure even very thin substrate bodies, especially their lateral surface, and thereby to impart a height modulation.

In this way, a height profile can be realized particularly easily and reliably, for example by influencing the substrate material in several curved effective areas. When the substrate material in the curved effective areas has been removed, for example by the influencing itself or by a subsequent etching process, the individual cavities in the substrate body can be connected to each other by subsequent etching, for example, by etching away the uninfluenced substrate material between the individual cavities. In this way, the characteristic wave-like structure along the major direction of extension of the distinguished surface can be achieved.

Preferably, the major direction of extension of the distinguished surface extends perpendicular to the major direction of extension of the curved effective areas.

Alternatively or additionally, it is also provided that
(i) the substrate body is transparent, is made of glass, and/or comprises a second top surface which extends preferably parallel to and/or is arranged opposite the first top surface,
(ii) the thickness of the substrate body, preferably measured between the first and second top surfaces, is 500 µm or less, preferably 400 µm or less, more preferably 300 µm or less, more preferably 200 µm or less, more preferably 100 µm or less, more preferably 70 µm or less, more preferably 50 µm or less, more preferably 30 µm or less, most preferably 10 µm or less,
and/or (iii)
1. the distinguished surface extends between the first and second top surfaces,
2. the distinguished surface is connected to the first and/or the second top surface at least in certain areas,
3. at least one part of at least one lateral surface, preferably a circumferential lateral surface, of the substrate body comprises the distinguished surface,
4. at least one part of a surface of a through hole, which preferably extends from the first top surface to the second top surface, comprises the distinguished surface, and wherein preferably the through hole is formed by influencing and/or etching the substrate material,
5. at least one surface area of a cavity of the substrate body comprises the distinguished surface, wherein the cavity is preferably accessible from the outside or is completely enclosed in the substrate material, and wherein preferably the cavity is formed by influencing and/or etching the substrate material,
6. the distinguished surface represents at least in certain areas an inwardly facing surface of the substrate body, and/or
7. the distinguished surface represents, at least in certain areas, an outwardly facing surface of the substrate body.

Alternatively or additionally, it is also provided that the first curved progression of the distinguished surface extends perpendicular to the major direction of extension of the distinguished surface, and/or that in the major direction of extension of the distinguished surface, in particular in the circumferential direction of the substrate body, the distinguished surface comprises at least in certain areas a second curved progression.

Alternatively or additionally, it is also provided that in at least one cross-sectional plane of the substrate body the distinguished surface has a contour which, along the first curved progression
(i) is convexly or concavely curved at least in sections,
(ii) corresponding at least in sections to a contour of the curved effective area, and/or
(iii) has, at least in sections, a parabolic progression, a quartic progression, a logarithmic progression, a progression according to a polynomial function of degree n, preferably with even n, in particular with n=6, n=8, n=10 or n=12, and/or a C-shaped progression.

These features have already been described in the corresponding features of the first aspect of the disclosure. The explanations apply mutatis mutandis here. Therefore, reference can be made to the explanations given there.

The object is achieved by the disclosure according to a third aspect in that a substrate body, preferably according to the second aspect of the disclosure, wherein the substrate body has, at least in certain areas, at least one spatial modification of its substrate material, such as a change in the refractive index, a change in density and/or a cavity, wherein the modification has a curved contour in a cross-sectional plane of the substrate body at least in certain areas, wherein preferably the modification extends from a first top surface of the substrate body into the substrate material, in particular in the direction of and/or up to a second top surface of the substrate body, wherein the second top surface is preferably arranged opposite to and/or extends parallel to the first top surface, wherein preferably the substrate body has a thickness of 500 µm or less, which is measured in particular between the first and the second top surface of the substrate body, is proposed.

For the first time, a substrate body is provided which, despite its small thickness, can comprise corresponding modification structured with a curved contour in the cross-sectional plane.

This has not been possible up to now, in particular for such thin substrate bodies. Here, conventionally, the same problems arise as described above with respect to the second aspect of the disclosure.

The electromagnetic field can also be formed within a very thin substrate body and can influence there the substrate material accordingly. Thus, even very sensitive, since thin, substrate bodies can be provided with such modifications. This is optimal for microsheets.

A modification can be, for example, a change in the refractive index and/or the density of the substrate material. A modification can also be a cavity in the substrate material.

The substrate body preferably has a substrate thickness of 400 µm or less, 300 µm or less, 200 µm or less, 100 µm or less, 50 µm or less, or 10 µm or less.

Preferably, the substrate body has a substrate thickness of 0.1 µm or more, 1 µm or more, 10 µm or more, 50 µm or more, or 100 µm or more.

In one embodiment, the substrate body is made of or comprises glass, glass ceramic, silicon, or sapphire.

Alternatively or additionally, it is also be provided that the modification has a maximum deflection from a straight progression that is greater than 20 µm, greater than 40 µm, greater than 60 µm, greater than 80 µm, or greater than 100

μm, and/or that the length of the modification is respectively greater than 0.1 mm, greater than 0.3 mm, greater than 0.5 mm, greater than 0.7 mm, greater than 1 mm, greater than 3 mm or greater than 5 mm.

These features have already been described at the corresponding features of the first aspect of the disclosure. The explanations apply mutatis mutandis here. Therefore, reference can be made to the explanations given there.

BRIEF DESCRIPTION OF THE FIGURES

Further features and advantages of the disclosure will be apparent from the following description, in which preferred embodiments of the disclosure are explained with reference to schematic drawings.

In the Figures.

EXAMPLES

Figure 1:
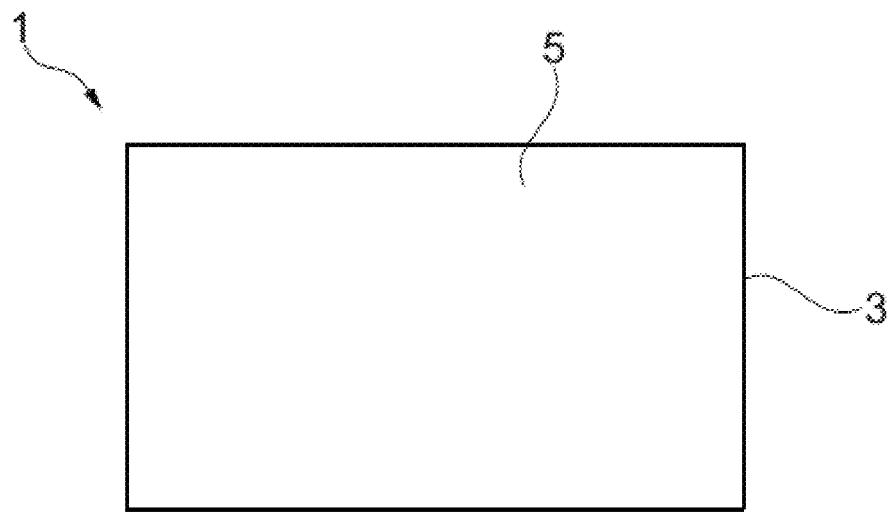
FIG. 1 shows a top view of a first substrate body.

FIG. 1 shows a top view of a cuboid transparent substrate body 1. The substrate body 1 is made of glass, that is, its substrate material is made of glass.

The lateral surface 3 of the substrate body 1 on the right in FIG. 1 is to be structured. That is, the lateral surface 3 is to be given a new shape.

Figure 2:
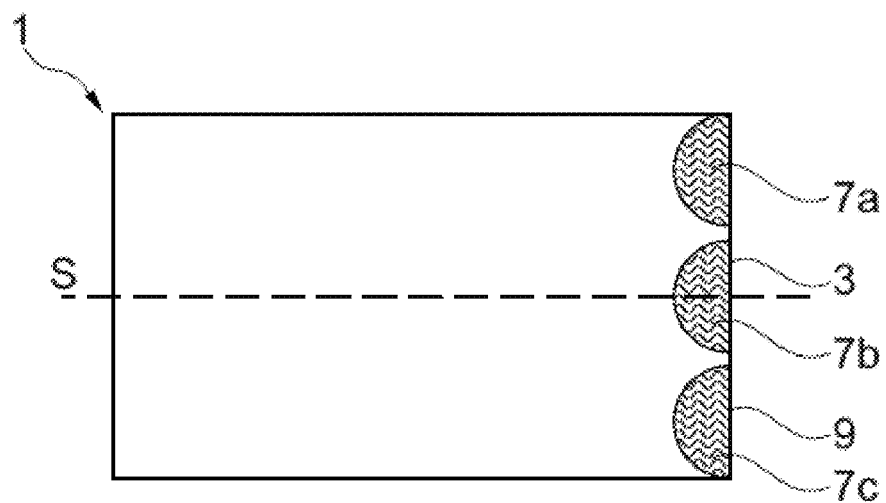
FIG. 2 shows a first cross-sectional view of the first substrate body.

FIG. 2 shows a cross-sectional view of the substrate body 1, wherein the cross-sectional plane extends parallel to the first top surface 5 of the substrate body 1.

In order to structure the new surface of the previously unstructured lateral surface 3, the substrate material of the substrate body 1 is equally exposed to an electromagnetic field in several curved effective areas 7a-7c, which causes there a respective non-linear interaction with the substrate material. As a result of the nonlinear interaction, the substrate material is influenced in the area of the curved effective areas 7a-7c. The influence is accompanied by a change in the refractive index of the substrate material.

Here, the electromagnetic field is respectively that of a line focus of a laser formed within the substrate material. By moving the line focus relative to the substrate body 1, the line focus of the laser is sequentially formed in different areas of the substrate material. That is, the substrate material is sequentially influenced first in the curved effective area 7a, then in the curved effective area 7b, and then in the curved effective area 7c.

Here, the electromagnetic field of the line focus just corresponds to the individual curved effective area. And the individual curved effective area respectively corresponds to the area with influenced substrate material.

The laser beam can be propagated by a spatial light modulator and, depending on the imposed phase, the line focus is also curved and thus the respective curved effective area is shaped.

The individual curved effective areas are arranged at a distance from one another. In the cross-sectional plane of FIG. 2, the centroids (not shown) of the intersecting surfaces of curved effective areas 7a-7c and the cross-sectional plane extend along a straight line which extends parallel to the edge 9 of the lateral surface 3.

Figure 3:
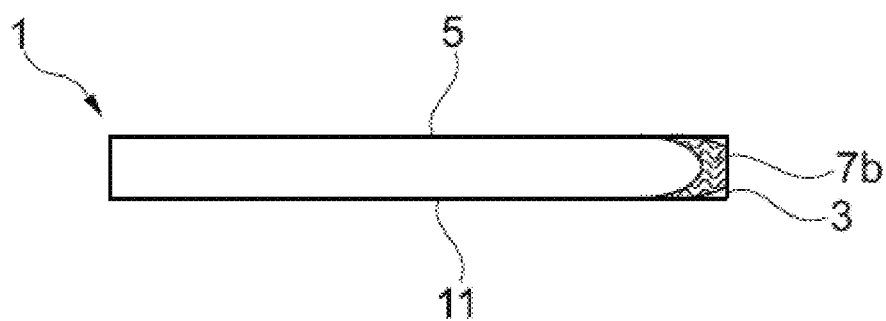
FIG. 3 shows a second cross-sectional view of the first substrate body.

FIG. 3 shows another cross-sectional view of the substrate body 1, wherein the cross-sectional plane extends perpendicular to the first top surface 5 of the substrate body 1 and intersects the cross-sectional view of FIG. 2 in the intersection line S shown therein in dashed lines. The crescent shape of the curved effective area 7b can be seen in FIG. 3. The other curved effective areas, which are not shown in FIG. 3, have the same shape in a corresponding parallel cross-sectional plane.

If the respective cross-sectional plane in FIGS. 2 and 3 were respectively shifted parallel, the shape of the intersection surface with the curved effective area(s) would also change. How exactly depends on the three-dimensional shape of the curved effective areas. The spatial shape of the curved effective areas can be adjusted and adapted by the phase of the line focus.

As can be further seen in FIG. 3, the curved effective areas 7a-7c intersect the first top surface 5, the second top surface 11 and the lateral surface 3 to be structured of the substrate body 1, respectively. Therefore, the influenced substrate material is accessible from the outside at the corresponding intersection surface of the substrate body 1 and the curved effective areas 7a-7c.

Figure 4A:
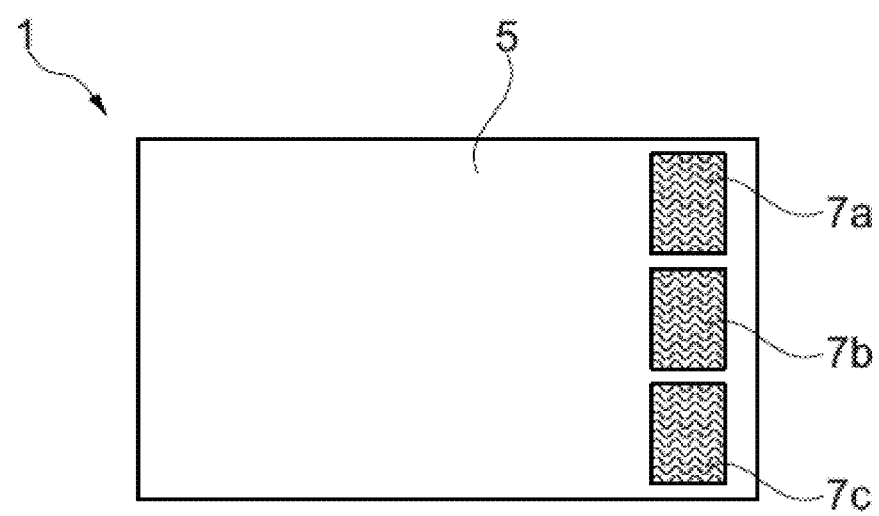
FIG. 4a shows a top view of the first substrate body with influenced substrate material.
Figure 4B:
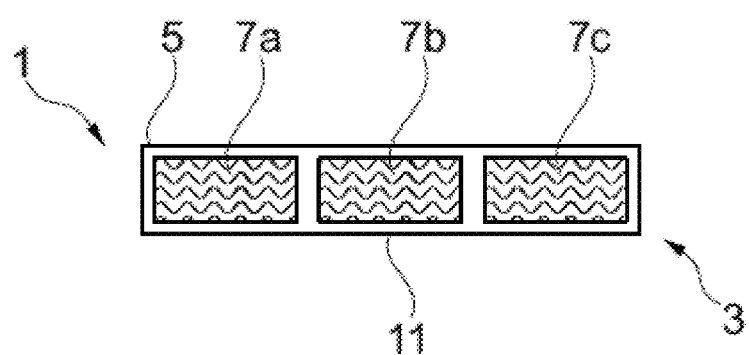
FIG. 4b shows a side view of the first substrate body with influenced substrate material.

FIG. 4a shows a top view of the substrate body 1, where the curved effective areas 7a-7c with their intersection surfaces with the first cover surface 5 are visible. FIG. 4b shows the substrate body 1 from the side and thus the lateral surface 3 to be structured, where the curved effective areas 7a-7c with their intersection surfaces with the lateral surface 3 are also visible.

The influenced substrate material is then removed by applying selective laser etching. For this purpose, the substrate body 1 is exposed at least locally to an etching medium.

Laser selective etching etches away both influenced and uninfluenced substrate material from the substrate body 1. However, the influenced substrate material is etched away faster than the uninfluenced substrate material.

Figure 5:
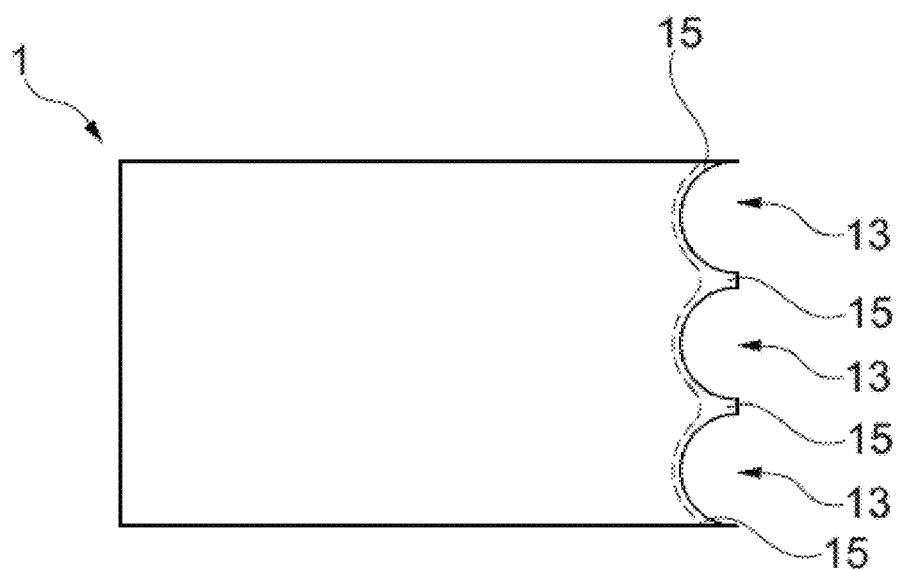
FIG. 5 shows different progressions of the lateral surface of the first substrate body after an etching process in the cross-sectional plane of the first cross-sectional view.

FIG. 5 shows the substrate body 1 in the same cross-sectional plane as previously shown in FIG. 2, but after the etching process. If the etching process would remove only influenced substrate material, the contour of the structured substrate body would extend in the cross-sectional plane of FIG. 5 according to the solid line. The curved effective areas 7a-7c form circular contours 13 in the substrate material in the cross-sectional plane of FIG. 5.

However, since the etching process also removes uninfluenced material, the substrate material 15 between the individual curved effective areas and in the edge region is also partially etched away. Thus, in particular, the webs between the areas with influenced material are removed. In addition, for the same reason, overall, the circular contour 13 is also shifted into the substrate material, as is to be indicated by the slightly offset progression of the dashed line.

The previously unstructured lateral surface 3 of the substrate body 1 therefore has a contour according to the dashed line in the cross-sectional plane of FIG. 5 after structuring.

Figure 6A:
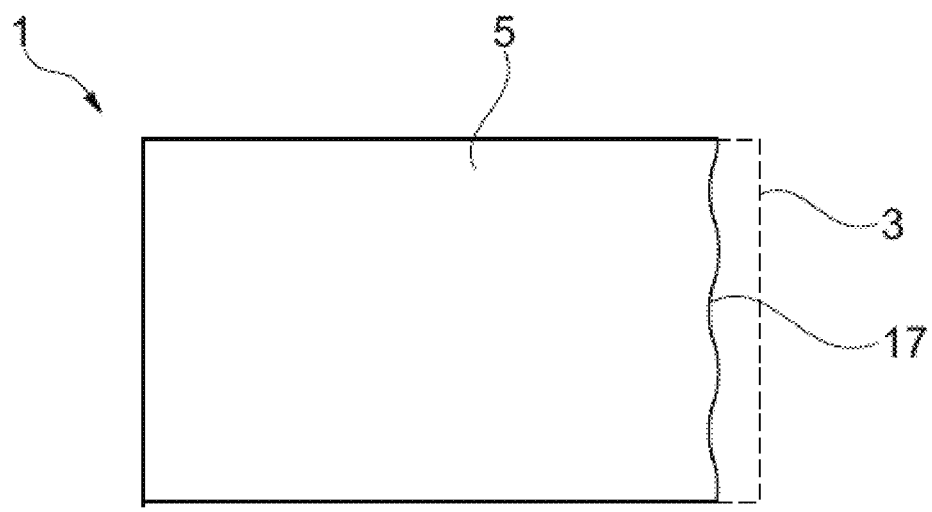
FIG. 6a shows the first substrate body after the etching process in the cross-sectional plane of the first cross-sectional view.
Figure 6B:
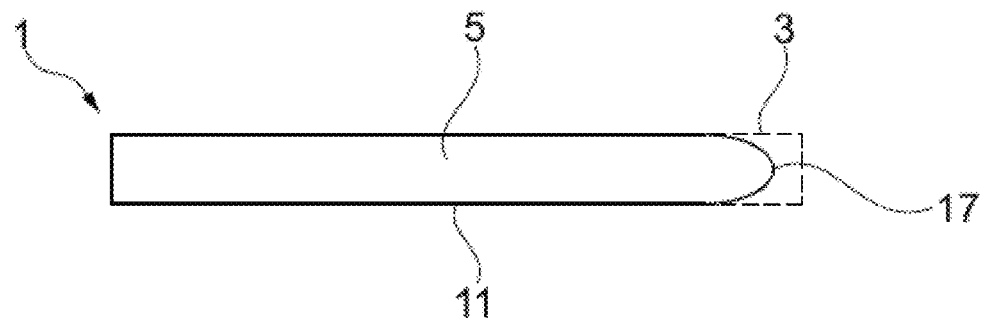
FIG. 6b shows the first substrate body after an etching process in the cross-sectional plane of the second cross-sectional view.

FIG. 6a shows in the cross-sectional plane of FIG. 2 and FIG. 6b shows in the cross-sectional plane of FIG. 3 the progression of the structured surface 17 and for comparative purposes in a dashed line the progression of the original, unstructured surface 3. The structured surface 17 is modulated in height and comprises in certain areas a calotte-shaped structure corresponding to the calotte-shaped recesses.

The structured surface 17 is consequently formed by removing the influenced substrate material and furthermore also uninfluenced substrate material by etching. The structured surface 17 is an distinguished surface in the sense of the present disclosure.

The structured surface 17 is connected to the first and second top surfaces 5, 11 at least in certain areas. The structured surface 17 is an outer surface.

The curved progression of the structured lateral surface 17 shown in FIG. 6b is convex and corresponds to a first curved progression. The first curved progression was influenced by the shape of the curved effective area 7b. Thus, although the etching process here has also removed portions of the unaffected substrate material, the basic progression of the structured right-hand lateral surface 17 of the substrate body 1 is co-determined in certain areas by the curved shape of the curved effective area respectively applied there, here curved effective area 7b. Since the curved effective areas 7a-7c contribute to the structuring of the surface at several points, the structured surface 17 has the same first curved progression at several areas. This is because at a plurality of areas, the curved shape of the curved effective areas 7a-7c determines or influences the progression of the structured surface 17. In other words, the first curved progression is achieved by the plurality of curved effective areas at a plurality of areas of the structured or distinguished surface 17.

In FIGS. 3 and 6b, the first and second top surfaces 5, 11 of the substrate body 1 extend parallel to each other and have a distance of 500 μm from each other.

If the curved effective areas 7a-7c would have been rotated 180° about an axis perpendicular to the first top surface 5, the first curved progression would be concave in the cross-sectional plane of FIG. 6b.

When the curved effective areas 7a-7c are positioned away from the surface 3 to be structures toward the center of the substrate body 1, the substrate body 1 can be separated into two parts. At the separating surface, the remaining substrate body then comprises a structured surface such as the structured surface 17 when a corresponding procedure is performed as described above.

Figure 7A:
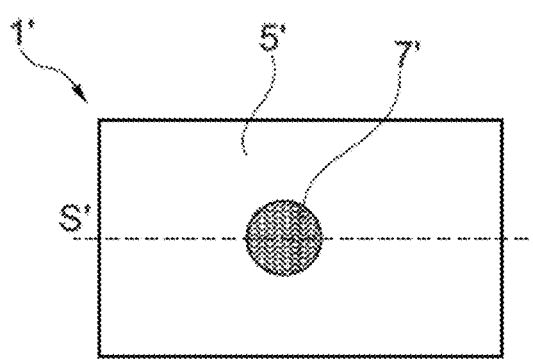
FIG. 7a shows a top view of a second substrate body.
Figure 7B:
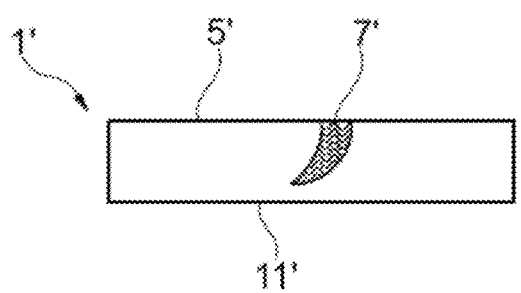
FIG. 7b shows a cross-sectional view of the second substrate body.

FIG. 7a shows a top view of a substrate body 1' and FIG. 7b shows a cross-sectional view of the substrate body 1, wherein the cross-sectional plane extends perpendicular to the first top surface 5' of the substrate body 1' and intersects the cross-sectional view of FIG. 7a in the intersection line S' shown there in dashed lines. In the substrate body 1, the substrate material is influenced only in a single curved effective area 7'. The curved effective area 7' extends from the first top surface 5' in the direction of the second top surface 11'. When the influenced material is etched away, a cavity can be created in the substrate body 1'. The surface thereof is the structured surface and thus the distinguished surface. This is then an inner surface.

Figure 8A:
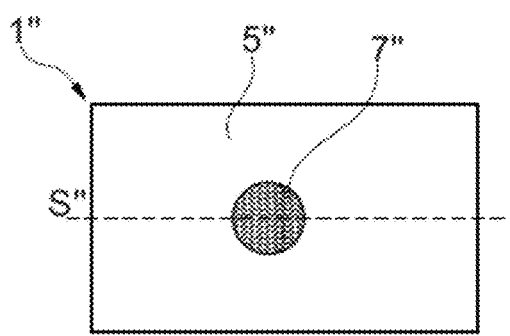
FIG. 8a shows a top view of a third substrate body.
Figure 8B:
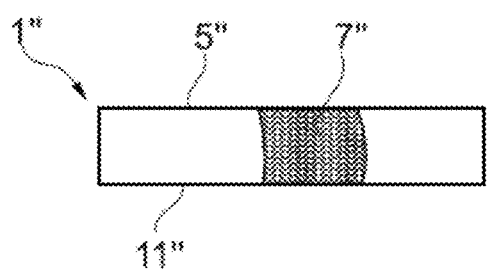
FIG. 8b shows a cross-sectional view of the third substrate body.

FIG. 8a shows a top view of a substrate body 1'' and FIG. 8b shows a cross-sectional view of the substrate body 1'', wherein the cross-sectional plane extends perpendicular to the first top surface 5'' of the substrate body 1'' and intersects the cross-sectional view of FIG. 8a in the intersection line S'' shown there in dashed lines. In the substrate body 1'', the substrate material is influenced only in a single curved effective area 7''. The curved effective area 7'' extends from the first top surface 5'' to the second top surface 11''. When the influenced material is etched away, a through hole, i.e. a via, can be created in the substrate body 1''. The surface of which is the structured surface and thus the distinguished surface. This is then an inner surface.

Figure 9:
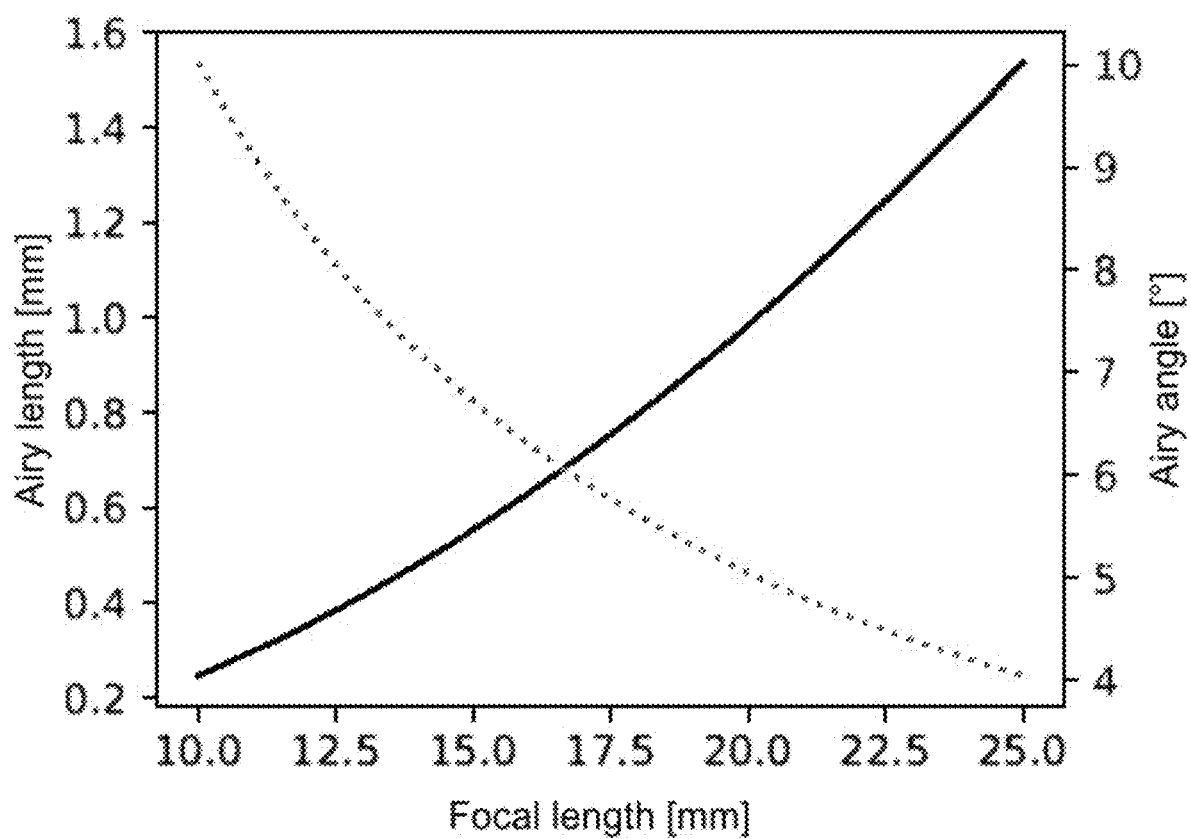
FIG. 9 shows the influence of the focal length of the focusing optics for a laser beam.

Influence of the Focal Length of the Focusing Optics:

FIG. 9 illustrates the influence of the focal length of the focusing optics for an Airy laser beam. For constant
cubic phase (with beta=$3^{1/3} \times 10^3$/m);
laser wavelength (with lambda=$1.030 \times 10^{-6}$ m); and
beam diameter (diameter of the raw beam $w_0 = 5 \times 10^{-1}$ m)
the length of the focus area (in relative definition: decrease to $1/e^2$ of the maximum value) increases with increasing focal length (curve with solid line in FIG. 9) and the angle which the focus has at the upper and lower end respectively to the optical axis decreases (curve with dashed line in FIG. 9). The left ordinate therefore refers to the solid line and the right ordinate refers to the dashed line.

Figure 10:
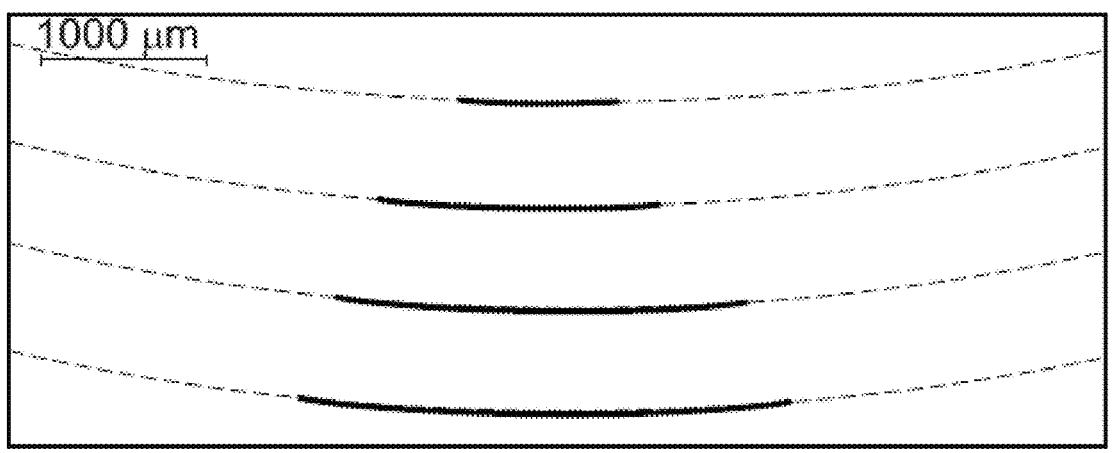
FIG. 10 shows line foci for different laser powers.

Influence of the Laser Power on the Line Focus:

FIG. 10 shows material areas in a glass substrate influenced by line foci of different laser power. From top to bottom the laser power increases and thus the extent of the respective curved effective area and thus the area of the influenced material.

Influence of a Tilt and Offset of a Line Focus:

Offset refers to the distance of the vertex of the focus area from the center of the substrate body. Tilt refers to the angle between the surface normal and the tangent at the vertex.

For a centered, untilted Airy beam, the vertex of the focal area along the normal of the substrate surface is at the center of the substrate body, i.e., at the center of its thickness extension, and the surface normal and the tangent at the vertex are parallel.

Figure 11:
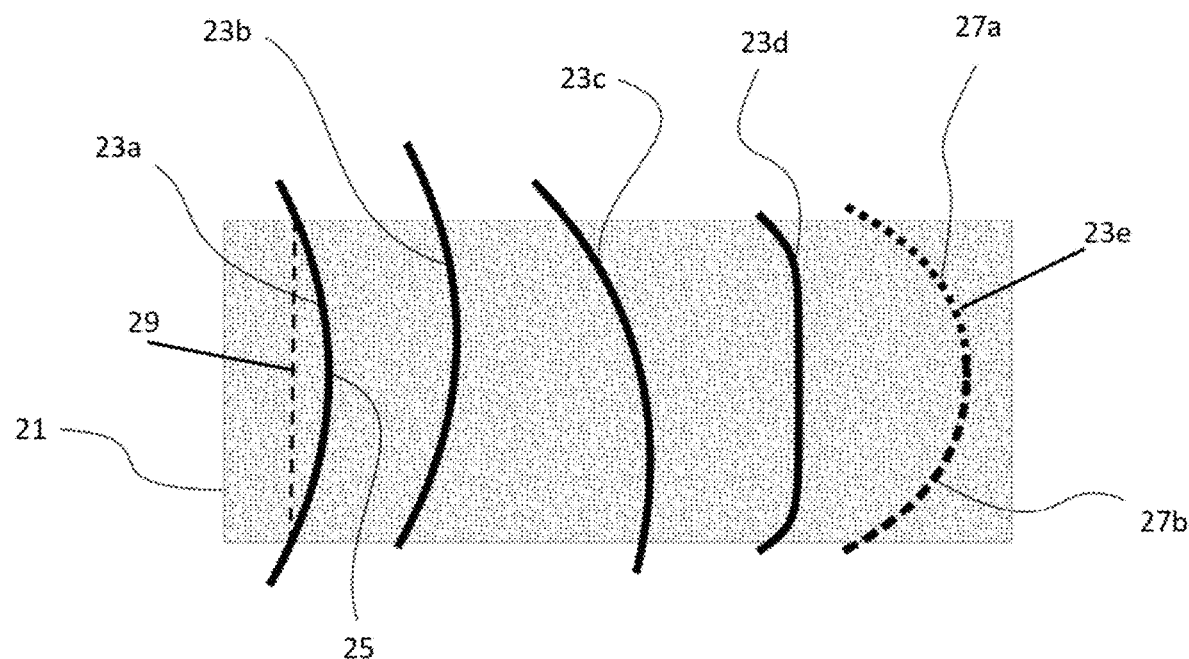
FIG. 11 shows different line foci in a substrate body.

FIG. 11 shows various line foci 23a-23e of laser beams formed at least partially in a substrate body 21. The cross-sectional plane of FIG. 11 shows the thickness region of the substrate body 21.

Line focus 23a represents a line focus, in particular of an Airy beam, which is centered and has no tilt. Line focus 23a comprises a vertex 25 of the parabolic focus area 23a.

Line focus 23b shows a line focus, in particular of an Airy beam, that is offset.

Line focus 23c depicts a line focus, in particular of an Airy beam, that is tilted and offset.

Line focus 23d represents a line focus, in particular of a different function than that of an Airy beam, with variable curvature. For example, the curvature could describe a C profile.

The line focus 23e represents a line focus, in particular of an Airy beam or another function, which modifies an upper part of the substrate material 1 in a first region 27a and which modifies a lower part of the substrate material 1 in a second region 27b.

In FIG. 11, moreover, the length of each line focus 23a-23e can be determined as the length of the curved progression shown, in particular within the substrate body 1. Also shown with respect to the line focal point 23a is a connecting line 29 that passes through the ends of the line focal point 23a within the substrate body 21. This can be understood as the straight focal line, and the maximum deflection from the straight focal line is just equal to the distance between the connecting line 29 and the vertex 25.

Phase Functions

Various exemplary phase functions which can be imparted to a laser beam and according to which the curved effective areas can be formed in a substrate material are shown in the following table:

| Acceleration profile | Phase |
| --- | --- |
| Parabolic: $c(z) = az^2$ | $\phi(y) = -4/3 a^{1/2} k y^{3/2}$ |
| Quarternary: $c(z) = az^4$ | $\phi(y) = -16/21 (3a)^{1/4} k y^{7/4}$ |
| Logarithmic: $c(z) = a \ln(bz)$ | $\phi(y) = e^{-1} a^2 bk(1 - \exp[-y/a])$ |
| Polynomial: $c(z) = az^n$ (for even n) | $\phi(y) = kn^2 y^2 \dfrac{[a(1-n)/y]^{1/n}}{(2n-1)(1-n)}$ |

The parameters are described in the publication Froehly, L., Courvoisier, F., Mathis, A., Jacquot, M., Furfaro, L., Giust, R., . . . & Dudley, J. M. (2011), "Arbitrary accelerating micron-scale caustic beams in two and three dimensions", Optics express, 19(17), 16455-16465.

Figures 12A, 12B, 12C:
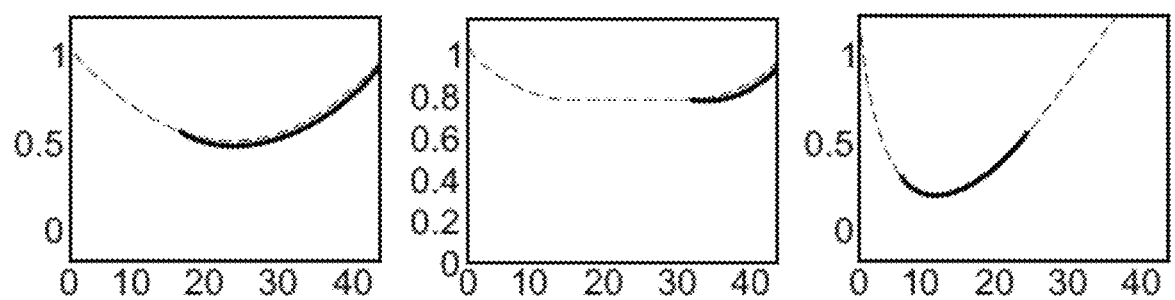
FIG. 12a-12c show line foci for different phase functions.

FIGS. 12a-12c show exemplary line foci for different phase functions. The horizontal axis has respectively the unit millimeter (mm). The vertical axis has respectively the unit millimeter (mm).

FIG. 12a shows a laser beam which comprises a line focus with a parabolic acceleration profile. FIG. 12b shows a laser beam that comprises a line focus with a quaternary acceleration profile. FIG. 12c shows a laser beam that comprises a line focus with a logarithmic acceleration profile. With corresponding line foci, different curved effective areas can be realized and thus the substrate material can be influenced in corresponding spatial areas.

The entire, theoretical progression of the line focus according to the phase function is respectively shown as a dashed line. The line focus itself is formed only along a section (partly somewhat offset, in order to be able to recognize the theoretical progression). Only where the line focus is formed, a nonlinear interaction can take place. From this, it becomes fundamentally understandable how by use of the line focus a cavity that is accessible from the outside or a completely enclosed cavity can be obtained.

Figure 13:
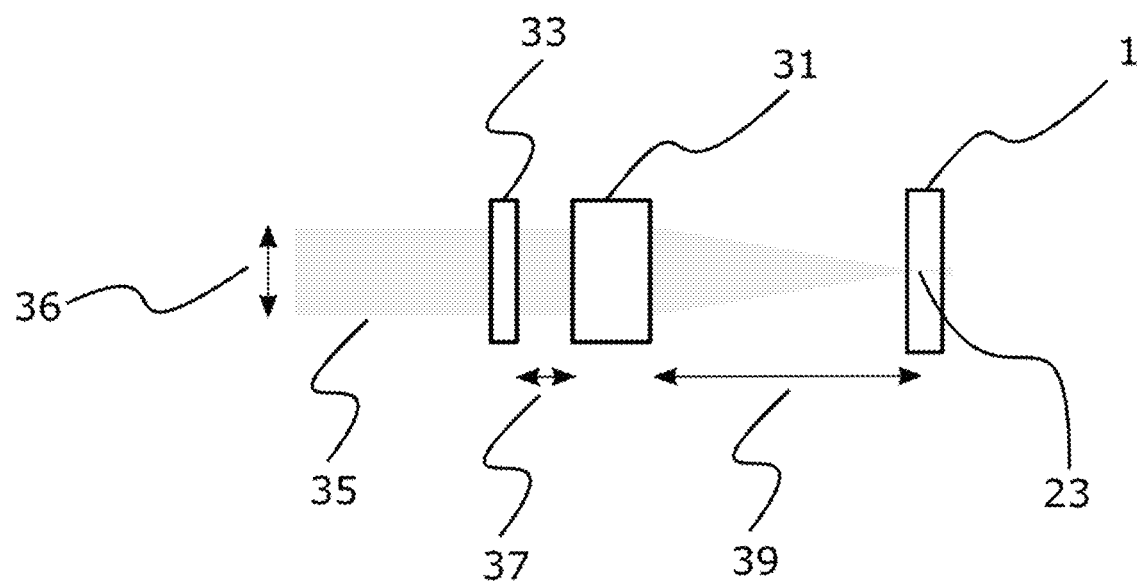
FIG. 13 shows an optical setup of a 2f configuration.

FIG. 13 shows an optical setup of a 2f configuration as it can preferably be used for the method according to the disclosure. Here, a phase distribution is imparted onto an incoming laser beam 35 having a beam diameter 36 by a phase mask 33 and imaged into a substrate 1 by the downstream focusing optics 31 located at a distance of its input-side focal length 37 from the phase mask 33 at a distance corresponding to its output-side focal length 39, so that a curved line focus 23 is formed within the substrate 1.

Figure 14:
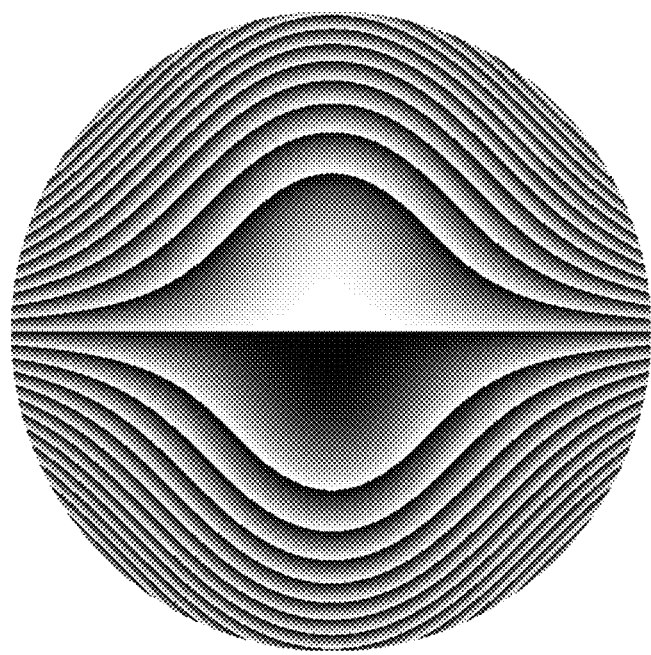
FIG. 14 shows a gray value coded representation of a phase shift.

FIG. 14 shows a gray-value coded representation of the exemplary phase shift imparted onto the laser beam 35 by the phase mask 33, which can preferably be realized in the form of an SLM (spatial light modulator) or DOE (diffractive optical element), as a result of which the laser focus obtains its curved contour 23. Here, phase values from 0 to 2 Pi are represented by a gray value from 0 to 255. The phase distribution exists in a cross-sectional plane perpendicular to the major propagation direction of the laser beam.

Figure 15:
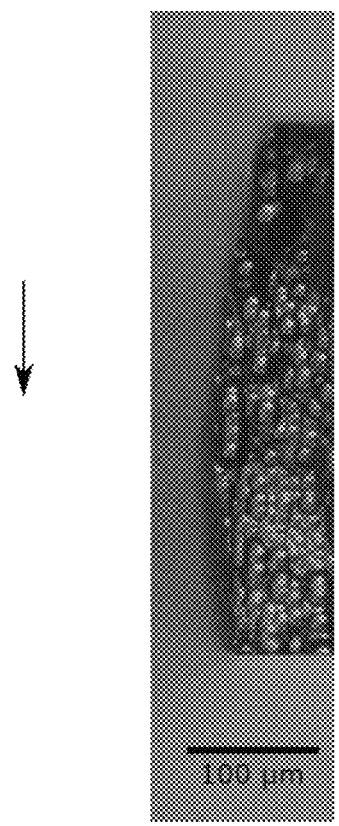
FIG. 15 shows a top view of a processed substrate body.

FIG. 15 shows a top view of a substrate body structured by the method according to the disclosure. In particular, the normal vector of the distinguished surface extends in the drawing plane of FIG. 15. Therefore, the first curved progression of the distinguished surface can be seen particularly advantageously in FIG. 15.

Here, the laser beam used for structuring extended parallel to the drawing plane of FIG. 15, as indicated by the arrow.

The following general parameters and laser parameters were set for the structuring of the distinguished surface:
  microscope objective and/or Fourier lens with a focal length of f=10 mm;
  wavelength of 1030 nm;
  beam diameter of 5.3 mm;
  cubic phase $\varphi = \exp(i \cdot (x^3 + y^3))$, equivalent to $$\varphi = \exp\left(\frac{i\beta}{3} * (x^3 + y^3)\right)$$

with $\beta = 3^{1/3}$ mm$^{-1}$ for x and y in mm;
  pulse duration τ=5 ps;
  number of pulses in burst N=2;
  energy per burst 228 µJ; and
  a pitch of 10 µm.

Figure 16:
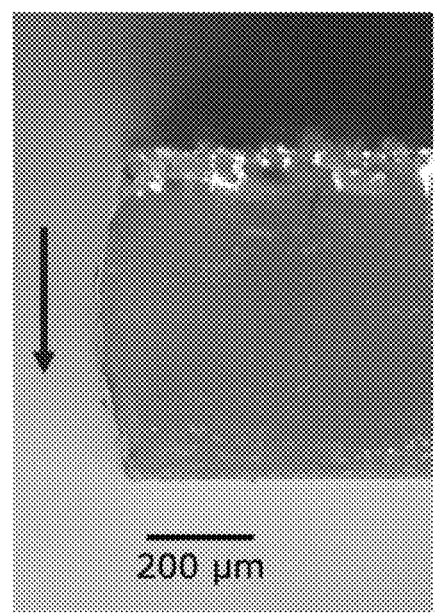
FIG. 16 shows a top view of a processed substrate body.

FIG. 16 shows a top view of a substrate body structured by the method according to the disclosure. In particular, the normal vector of the distinguished surface extends in the drawing plane of FIG. 16. Therefore, the first curved progression of the distinguished surface can also be seen particularly advantageously in FIG. 16.

The laser beam used for structuring extended parallel to the drawing plane of FIG. 16, as indicated by the arrow.

The following general parameters and laser parameters were set for the structuring of the distinguished surface:
  substrate material with a thickness selected from the range between 900-1000 µm, for example BF33;
  a pitch of 40 µm;
  microscope objective and/or Fourier lens with a focal length of f=10 mm;
  ×2.0 beam expander (for 10 mm diameter of the Gaussian input beam);
  pulse duration τ=5 ps;
  number of pulses in burst N=2;
  energy per burst of 300 µJ; and
  wavelength of 1030 nm;

cubic phase φ=exp(i·(x³+y³)), equivalent to $$\varphi = \exp\left(\frac{i\beta}{3} * (x^3 + y^3)\right)$$

with β=3^(1/3) mm⁻¹ for x and y in mm;

By choosing a sufficiently large pitch, as in this case, interactions between adjacent regions in the substrate with modifications are avoided or at least greatly reduced.

Figure 17:
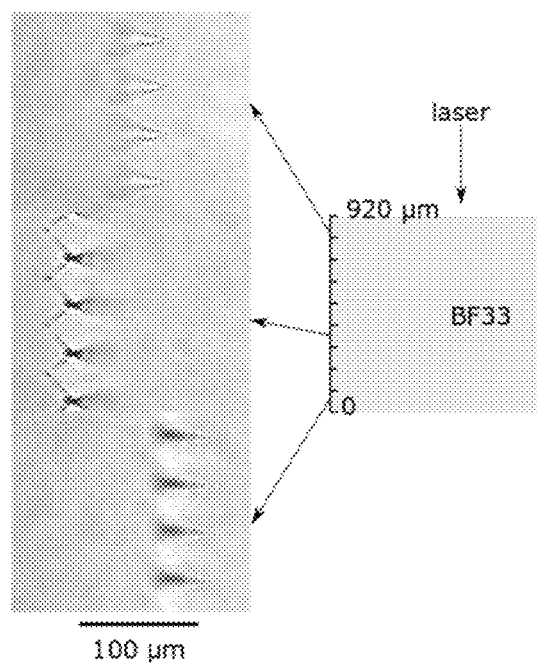
FIG. 17 shows the substrate body of FIG. 16 with introduced modifications.

FIG. 17 shows at the left hand top views in transmitted light microscopy onto the substrate after the laser process but prior to etching (the view here is parallel to the laser propagation direction). Here, the lateral characteristics of the modifications can be seen, wherein several modifications being visible for each of three selected, different depths in the substrate. The respective depths are marked in the right part of FIG. 17.

When introducing the modification, a sufficiently large pitch was selected so that the extensions of the laterally angled/arrow-like shaped modifications overlap only minimally. This ensured that the propagation within the material is not or only slightly disturbed by previous modifications.

Thus, the "zig-zag" pattern results from the modifications laterally extended near the focus, while the modifications continue to lie on a straight line/line. In addition, the apex of the curved effective area was kept centered between the two top surfaces and the curved effective area was formed entirely within the substrate material.

Figures 18A, 18B, 18C:
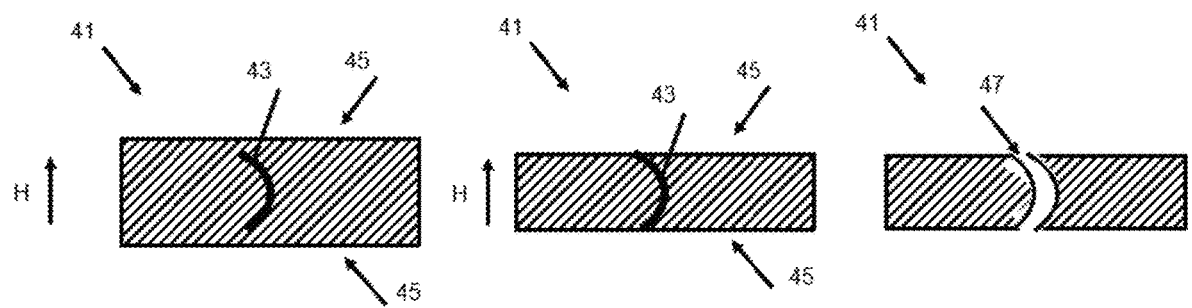
FIG. 18a shows a cross-sectional view of a substrate body with enclosed curved effective area.
FIG. 18b shows a cross-sectional view of a substrate body with externally accessible material modification.
FIG. 18c shows a cross-sectional view of a structured substrate body.

FIG. 18a shows a rectangular substrate body 41 in a cross-sectional view. Within the substrate body 41, the substrate material has been exposed to an electromagnetic field in a curved effective area 43 so that, in the corresponding area the substrate material has been modified by a nonlinear interaction between the electromagnetic field and the substrate material due to nonlinear absorption.

The curved effective area 43, and thus the modification after its introduction, is completely enclosed within the substrate body 41.

Therefore, in accordance with embodiments of the disclosure, it is envisaged that material is removed from the substrate body, for example by etching. This can be done along the major direction of extension H of the curved effective area 43, which in the present case extends perpendicular to both top surfaces 45. In other words, material is thus removed from the two top surfaces 45 of the substrate body 41. The new top surfaces 45 of the substrate body are thus quasi displaced along the major direction of extension H. This can be seen in FIG. 18b. It can also be seen there that the substrate material 43 influenced in the enclosed curved effective area 43 becomes accessible from the outside as a result of the removal of substrate material, since parts of the influenced substrate material are now located at the surface of the top surfaces 45.

The curved effective area 43 and/or the substrate material 43 influenced therein have a progression that is not influenced by surface effects (such as of the top surfaces 45), since the interaction takes place entirely within the substrate body 41 (FIG. 18a).

Due to the accessibility of the modified substrate material 43 (FIG. 18b), the substrate body 41 can subsequently be further processed, as previously described, in order to structure an distinguished surface 47, as illustrated in FIG. 18c. For example the influenced material 43 is removed by etching for this purpose.

The features disclosed in the foregoing description, claims and drawings can be essential to the disclosure in its various embodiments, both individually and in any combination.

It is claimed:

1. A method for preparing and/or carrying out a structuring of a predetermined or predeterminable distinguished surface of a substrate body comprising a substrate material, the method comprising:
exposing at least one curved effective area of the substrate material to an electromagnetic field which causes a non-linear interaction between the electromagnetic field and the substrate material in the at least one curved effective area, and thus at least partially influencing the substrate material arranged in the at least one curved effective area; and
increasing or decreasing at least one property selected from the group consisting of: the refractive index, the etch rate, and the density of the substrate material, at least in certain areas,
wherein, after the structuring, the distinguished surface comprises, at least in certain areas, at least one first curved progression which is at least partially determined and/or influenced by the curved shape of the at least one curved effective area,
wherein the non-linear interaction causes at least one non-linear absorption of the electromagnetic field in the substrate material,
wherein the electromagnetic field is provided (i) in the form of a curved line focus of a laser beam, (ii) by a curved line focus of a laser beam, or (iii) in such a way that the at least one curved effective area is determined by the shape of the line focus,
wherein the at least one first curved progression extends from a first surface of the substrate body to a second surface opposite the first surface, and
wherein the influenced effective area penetrates two surfaces opposite to each other to create a curved through hole.

2. The method according to claim 1,
wherein the substrate material is exposed to an electromagnetic field in a plurality of curved effective areas, and
wherein
(i) the distinguished surface has the same first curved progression at several areas, determined or influenced by the curved shape of the plurality of curved effective areas, and/or has the first curved progression everywhere, and/or
(ii) the curved effective areas are selected to be arranged at a distance from one another, wherein in a cross-sectional plane of the substrate body the centers or centroids of the intersecting surfaces of the plurality of curved effective areas with the cross-sectional plane extend along a straight line or along any desired circular, curve, and/or successive effective areas have a distance from one another which is between either 30% and 100% or between 100% and 200% of the maximum extent of the plurality of curved effective areas in the cross-sectional plane.

3. The method according to claim 1, further comprising:
at least partially removing and/or displacing the substrate material from the at least one curved effective area.

4. The method according to claim 3, wherein the distinguished surface is formed by at least partially removing the substrate material by the influencing and/or by at least partially removing at least the influenced substrate material by at least one subsequent etching process or by an acid and/or by a caustic solution.

5. The method according to claim 1,
wherein the laser beam is provided by an ultrashort pulse laser,
wherein the phase of the laser beam is adjusted and/or adapted by a spatial light modulator, of a diffractive optical element and/or a combination of several cylindrical lenses,
wherein the laser beam is focused onto the substrate body by a microscope objective or a Fourier lens,
wherein the focusing takes place after adjusting or adapting the phase of the laser beam and/or forms the line focus,
wherein the line focus is that of an accelerated laser beam,
wherein the wavelength of the laser beam is 1064 nm, the microscope objective or the Fourier lens has a focal length of 10-20 mm, the coefficient of the cubic phase (laser parameter beta) has a value between $0.5 \times 10^3$/m and $5 \times 10^3$/m, the diameter of the raw beam (laser parameter coo) has a value between 1 mm and 10 mm, the pulse duration (laser parameter c) has a value of 0.1-10 ps, the pulse energy (laser parameter Ep) has a value between 1 and 1,500 µJ, and/or the number of pulses in the burst (laser parameter N) has a value between 1 and 200,
wherein the spatial extent of the at least one curved effective area is set and/or changed over time by varying an average power range of the laser and/or by changing the phase, and/or
wherein the spatial orientation of the at least one curved effective area is set and/or changed over time by varying a tilting of an optical axis of the laser beam relative to the normal to the substrate surface.

6. The method according to claim 1,
wherein, at least during the non-linear interaction, at least one auxiliary substrate body is arranged at the substrate body and the curved effective area and/or the line focus extends at least partially into the auxiliary substrate body, wherein two or more auxiliary substrate bodies are arranged at the substrate body on opposite sides of the substrate body, and the curved effective area and/or the line focus extends at least partially into two or more auxiliary substrate bodies.

7. The method according to claim 1, wherein at least one and/or all of the curved effective areas of the at least one curved effective area is completely enclosed within the substrate body at least during the non-linear interaction, and the method further comprising:
removing at least along a major direction of extension of the at least one curved effective area within the substrate body, and thereby making the substrate material influenced in the enclosed curved effective area at least partially and/or in certain areas accessible from the outside,
wherein the removal of material from the substrate body is carried out by etching.

8. The method according to claim 1,
wherein the at least one curved effective area is a plurality of curved effective areas,
wherein the substrate material is exposed to the electromagnetic field successively or wholly or partially in parallel in each of the plurality of curved effective areas,
wherein the entire substrate material within a curved effective area is simultaneously exposed to the electromagnetic field, and
wherein the plurality of curved effective areas each have a maximum deflection from a straight progression of more than 20 µm, and/or wherein the length of the plurality of curved effective areas is respectively more than 0.1 mm.

9. The method according to claim 1, wherein
(i) the substrate body is transparent, is made of glass, and the first surface and the second surface extend parallel to each other,
(ii) the thickness of the substrate body, measured between the first and second top surfaces, is 500 µm or less, and/or
(iii) after structuring the distinguished surface
 a. the distinguished surface extends between the first and second surfaces,
 b. the distinguished surface is connected to the first and/or the second surface at least in certain areas,
 c. at least one part of at least one lateral surface of the substrate body comprises the distinguished surface,
 d. at least one part of a surface of a through hole, which extends from the first surface to the second surface, comprises the distinguished surface, and the through hole is formed by influencing and/or etching the substrate material,
 e. at least one surface area of a cavity of the substrate body comprises the distinguished surface, wherein the cavity is accessible from the outside or is completely enclosed in the substrate material, and wherein the cavity is formed by influencing and/or etching the substrate material,
 f. the distinguished surface represents at least in certain areas an inwardly facing surface of the substrate body,
 and/or
 g. the distinguished surface is at least in certain areas an outwardly facing surface of the substrate body.

10. The method according to claim 7,
wherein after the structuring of the distinguished surface the first curved progression of the distinguished surface extends perpendicularly to the major direction of extension of the distinguished surface, and/or
wherein in the major direction of extension of the distinguished surface, the distinguished surface comprises at least in certain areas a second curved progression.

11. The method according to claim 1,
wherein after the structuring the distinguished surface in at least one cross-sectional plane of the substrate body the distinguished surface has a contour which along the first curved progression (i) is at least in sections convexly or concavely curved, (ii) corresponds at least in sections to a contour of the curved effective area, and/or (iii) comprises at least in sections a parabolic progression, a quartic progression, a logarithmic progression, a progression according to a polynomial function of degree n, with n=6, n=8, n=10 or n=12, and/or a C-shaped profile.

* * * * *